(12) United States Patent
Yoshida et al.

(10) Patent No.: US 10,380,833 B2
(45) Date of Patent: Aug. 13, 2019

(54) ITEM DISPENSING DEVICE

(71) Applicant: Masuki co., ltd, Saitama (JP)

(72) Inventors: Takashi Yoshida, Saitama (JP);
Toshiya Watanabe, Saitama (JP)

(73) Assignee: Masuki co., ltd, Saitama (JP)

( * ) Notice: Subject to any disclaimer, the term of this patent is extended or adjusted under 35 U.S.C. 154(b) by 0 days.

(21) Appl. No.: 16/218,084

(22) Filed: Dec. 12, 2018

(65) Prior Publication Data
US 2019/0114875 A1    Apr. 18, 2019

Related U.S. Application Data

(63) Continuation of application No. PCT/JP2017/027562, filed on Jul. 28, 2017.

(30) Foreign Application Priority Data

Aug. 5, 2016   (JP) .................................. 2016-154922

(51) Int. Cl.
*G07F 11/22* (2006.01)
*G07F 11/24* (2006.01)
(Continued)

(52) U.S. Cl.
CPC ......... *G07F 17/3216* (2013.01); *B65G 65/48* (2013.01); *G07F 11/16* (2013.01);
(Continued)

(58) Field of Classification Search
CPC ...... G07F 17/3216; G07F 11/16; G07F 11/44; G07F 11/24; G07F 11/22; B65G 65/48
(Continued)

(56) References Cited

U.S. PATENT DOCUMENTS 4,109,825 A * 8/1978 Weitzman ............... G07F 11/54
                                                                221/122
5,152,422 A * 10/1992 Springer ............... A61J 7/0084
                                                                221/113
(Continued)

FOREIGN PATENT DOCUMENTS

| JP | S49-65294 U1 | 6/1974 | |
|---|---|---|---|
| JP | 2013-149229 A | 8/2013 | |
| WO | WO-2018135236 A1 * | 7/2018 | .............. G07F 11/44 |

OTHER PUBLICATIONS

International Search Report issued in PCT/JP2017/027562 dated Sep. 12, 2017 with English Translation (4 pages).

*Primary Examiner* — Rakesh Kumar
(74) *Attorney, Agent, or Firm* — Nakanishi IP Associates, LLC

(57) ABSTRACT

Provided is an item dispensing device that can reduce the height of each device without decreasing the number of items to be stored. The item dispensing device includes: a storage case for storing capsules; an item ejection port provided in a side wall of the storage case; a vertical rotating shaft attached to the storage case; a motor for driving the rotating shaft to rotate; a circular plate provided in a lower part of the storage case and rotated by the rotating shaft, the circular plate being provided with item holders along the circumferential direction, each of the item holders having an opening in the outer circumferential direction and provided to be engageable with a capsule, wherein a part of the outer circumference of the circular plate is opposed to the item ejection port; and a capsule ejection mechanism for energizing the capsule engaged with one of the item holders toward the item ejection port side when the item holder is positioned at the item ejection port.

2 Claims, 24 Drawing Sheets

(51) Int. Cl.
*G07F 17/32* (2006.01)
*B65G 65/48* (2006.01)
*G07F 11/16* (2006.01)
*G07F 11/44* (2006.01)

(52) U.S. Cl.
CPC .............. *G07F 11/22* (2013.01); *G07F 11/44* (2013.01); *G07F 11/24* (2013.01)

(58) Field of Classification Search
USPC ........................................................ 221/265
See application file for complete search history.

(56) References Cited

U.S. PATENT DOCUMENTS

| | | | | |
|---|---|---|---|---|
| 5,605,249 A * | 2/1997 | Gonyea | .................... | G07F 11/54 |
| | | | | 221/11 |
| 5,772,072 A * | 6/1998 | Prescott | .................. | G07F 9/026 |
| | | | | 221/121 |
| 5,799,822 A * | 9/1998 | Rudewicz | ................ | G07F 9/026 |
| | | | | 219/678 |
| 7,402,280 B2 * | 7/2008 | Ford | .......................... | B01L 3/04 |
| | | | | 422/63 |
| 7,793,796 B1 * | 9/2010 | Evans | ...................... | A45D 8/00 |
| | | | | 221/113 |
| 9,159,183 B2 * | 10/2015 | Striebel | .................... | G07F 13/10 |
| 9,872,590 B2 * | 1/2018 | Lin | ....................... | A47K 5/1211 |
| 2007/0145066 A1 * | 6/2007 | Knoth | ...................... | G07F 11/44 |
| | | | | 221/265 |

\* cited by examiner

ITEM DISPENSING DEVICE

CROSS-REFERENCE TO RELATED APPLICATIONS

This application is a continuation application of International Patent Application No. PCT/JP2017/27562 filed on Jul. 28, 2017, which is based upon and claims the benefit of priority from the prior Japanese Patent Application No. 2016-154922, filed Aug. 5, 2016, the entire contents of which are incorporated herein by reference.

TECHNICAL FIELD

The present invention relates to an item dispensing device for dispensing one item at a time, for example, a capsule contained in a container, and more particularly, to an item dispensing device which can reduce the height of the container.

BACKGROUND

Capsule vending machines (item dispensing devices), such as shown in FIG. 27, for vending items such as capsule toys are known. In a capsule vending machine 300, a disc-shaped rotor 330 is placed in a lower part of a storage case 310, which stores a large number of capsules (items) C. A plurality of, e.g., four, circular holes (item holders) are arranged in the rotor 330 along its circumferential direction. One capsule C is held in each of the holes. One circular hole (item ejection hole) 311 is opened in the bottom of the storage case 310. For example, when a customer turns a lever manually, thereby rotating the rotor 330, and any of the four item holders in the rotor 330 is aligned with the item ejection hole 311 in the bottom of the storage case 310, the capsule C falls through the item ejection hole 311 to an item dispensing portion 320. The customer can take out the capsule C from the item dispensing portion 320. This structure similarly applies to Patent Literature 1.

CITATION LIST

Patent Literature

Patent Literature 1: Japanese Patent Laid-Open No. 2013-149229

SUMMARY OF INVENTION

Technical Problem

Item dispensing devices such as the capsule vending machine 300 described above have the following problem: the device needs to be formed higher than the storage case 310 by a dimension T necessary for the capsule C to fall in order to allow the capsule C to fall through the item ejection hole 311 opened in the bottom of the storage case 310. The same height as that of the capsule C is required for the dimension T at the minimum. On the other hand, considering height of the target customer, the total height needs to be reduced to some degree (about 150 cm).

Thus, when a plurality of capsule vending machines 300 are used in a stacked manner, it is necessary to reduce the number of stored capsules C to reduce the height of the storage case or reduce the number of the storage cases 310 while the height of the case is unchanged. There is a risk that it could be inconvenient for customers to experience that the capsules C easily became out of stock due to the reduced number of stored capsules C or that the item types were reduced due to the reduced number of the storage cases. Also, since the capsule C falls from the storage case to be ejected, there is a risk of the damage of the capsule C itself or the goods in the capsule C.

Thus, an object of the present invention is to provide an item dispensing device that can not only reduce the height of each device without reducing the item-storing capacity but also significantly reduce a ratio of damaged items.

Solution to Problem

In an item dispensing device for dispensing one item at a time according to one aspect of the present invention, a plurality of items are stored in a storage portion. An item ejection port is opened in a lower side-wall of the storage portion. A disc-shaped rotor is rotatably provided in a lower part of the storage portion. A plurality of item holders adapted to hold one item in each holder are disposed in the disc-shaped rotor along its circumferential direction. The item holder is in a substantially half-oval shape and opened radially outward. When an opening of any of the plurality of item holders is aligned with the item ejection port with rotation of the rotor, an item held in the item holder is ejected out of the storage portion through the item ejection port substantially horizontally.

Advantageous Effects of Invention

According to one aspect of the present invention, the item is pushed out substantially horizontally rather than falling, thereby being ejected from the storage portion, so the height of each device can be reduced without reducing the item-storing capacity and a ratio of damaged items can be significantly reduced.

DESCRIPTION OF EMBODIMENTS

Embodiments of the present invention will be described below with reference to the accompanying drawings. Note that while an item dispensing device includes a structure for ejecting capsules (items) from a storage portion with rotation of a rotor, where the rotation of the rotor is driven by rotation driving structures such as a hand-operated rotation structure in which the rotor rotates according to rotation of a hand-operated handle and a motor-driven rotation structure in which the rotor rotates according to rotation of a motor, the present invention may adopt either structure.

FIGS. 1 to 9 show an item dispensing device 1 with item dispensing devices 10 stacked according to the first embodiment of the present invention. It should be appreciated that although in the first embodiment, a rotor is described as rotating by the motor-driven rotation structure, the hand-operated rotation structure may be adopted.

Figure 1:
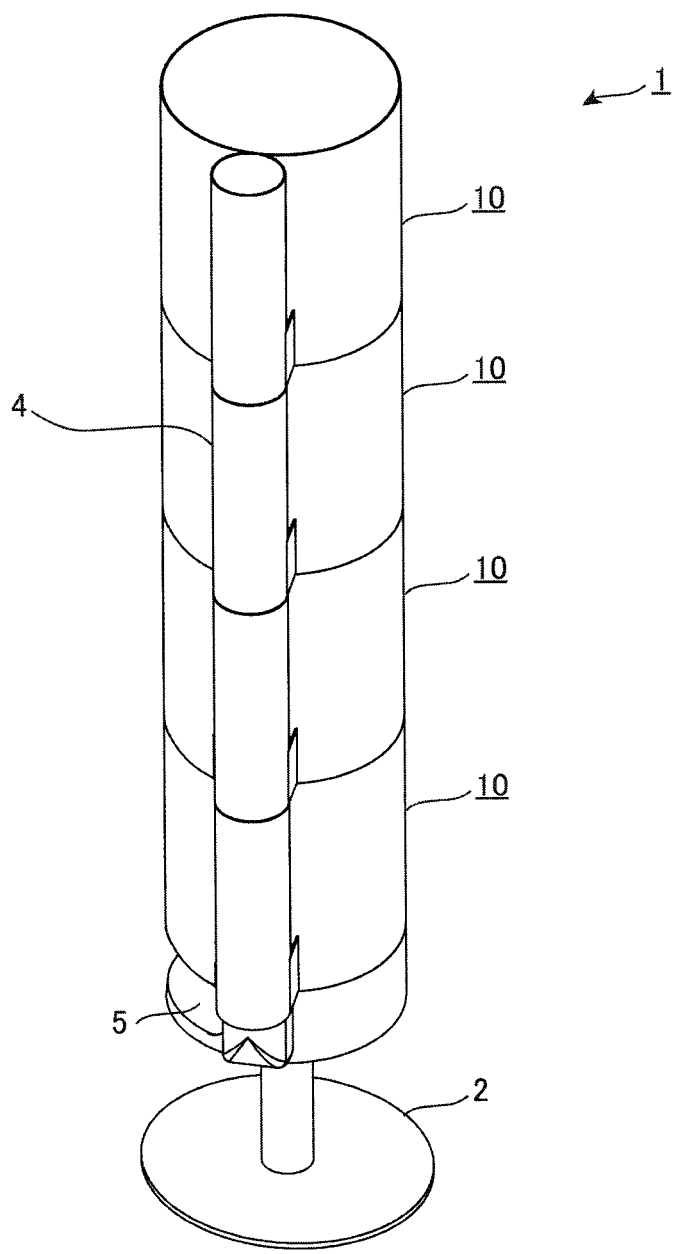
FIG. 1 is a perspective view of an item dispensing device including stacked item dispensing devices according to the first embodiment of the present invention.

As shown in FIG. 1, a plurality of item dispensing devices 10 are stacked and supported on the support, stand 2. A single item dispensing device 10 may be installed on a floor surface. A guide pipe 4 for capsules is connected to the plurality of item dispensing devices 10. An item dispensing slot 5 is attached to a lowermost part of the guide pipe 4. Note that although not illustrated, a control panel shared by the plurality of item dispensing devices 10 is attached to the support stand 2. The control panel is equipped with a plurality of selection buttons corresponding to the plurality of item dispensing devices 10, respectively. When any selection button is pressed, a motor of an item dispensing device 10 corresponding to that button is driven to rotate. Accordingly, a rotor of the said item dispensing device 10 rotates to cause an item stored therein to be ejected, and the item is delivered through the guide pipe 4 to the item dispensing slot 5. If the item dispensing devices 10 have the hand-operated rotation structure, each item dispensing device 10 is individually equipped with a hand-operated handle, which is not illustrated.

The item dispensing device 10 includes a bottomed-cylindrical storage case 20 for storing a plurality of capsules C and a capsule ejection mechanism 30 provided within the storage case 20. Unlike the conventional item dispensing device, a fall-through hole through which the capsule C fall is not opened in a bottom plate of the storage case 20. The item dispensing device 10 is characterized in that the device has a structure for ejecting the capsule C horizontally from the bottom plate of the storage case 20. In order to horizontally eject the capsule C, an item ejection port 21 which is slightly larger than the capsule C is opened in a part of a lower side-wall of the storage case 20. The item ejection port 21 is placed facing the guide pipe 4 so that the capsule C dispensed from the storage case 20 is guided through the guide pipe 4 to an item ejection unit 3. Note that the storage case 20 may have a separable structure in which an upper part and lower part thereof can be separated, where the upper part mainly stores a plurality of capsules C and the lower part houses a capsule ejection structure constituted of a rotor, a capsule push-out mechanism described hereafter, and the like.

Figure 2:
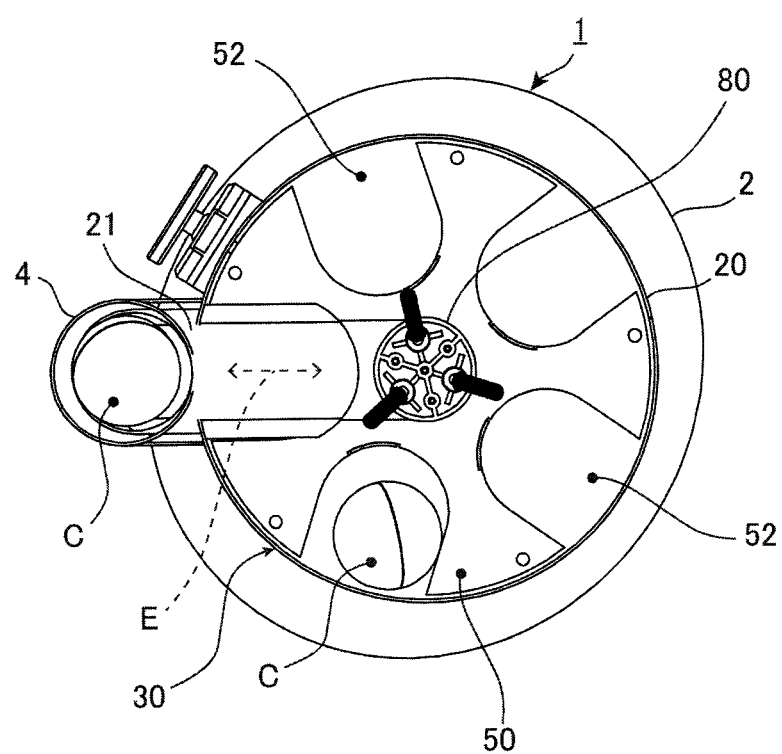
FIG. 2 is a plan view of the item dispensing device of FIG. 1.
Figure 3:
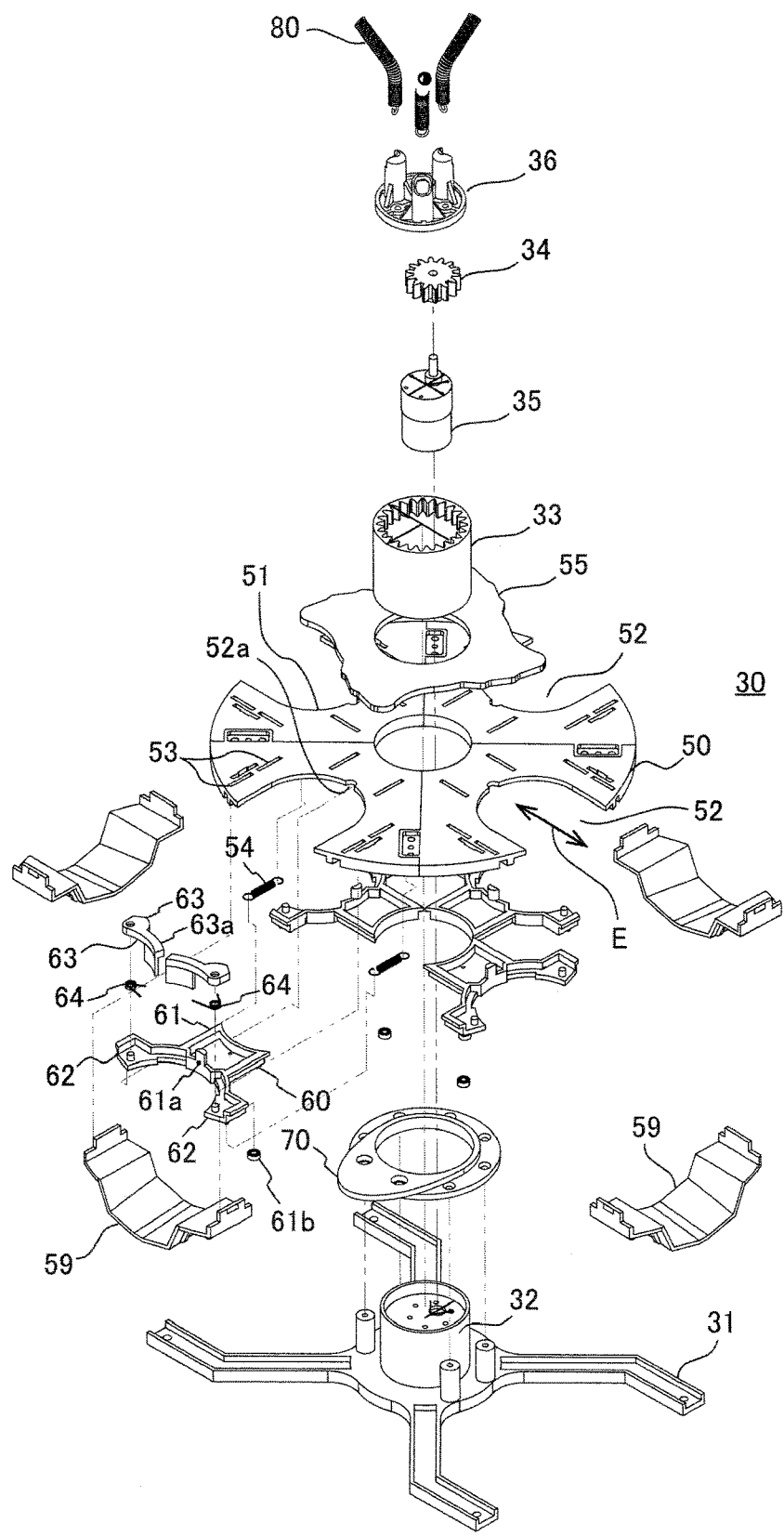
FIG. 3 is an exploded perspective view of an ejection mechanism integrated into the item dispensing device of FIG. 1.

As shown in FIGS. 2 and 3, the capsule ejection mechanism 30 includes: a base 31 fixed to the bottom of the storage case 20; a shaft support 32 provided on the base 31, where the axial direction thereof is the vertical direction; a cylindrical rotating shaft 33 supported by the shaft support 32 in a rotatable manner about the vertical axis and having internal teeth; a gear 34 meshed with the internal teeth of the rotating shaft 33; and a motor 35 for driving the gear 34 to rotate. The motor 35 is housed in the cylindrical rotating shaft 33 so that the housing structure and a speed reducer with the internal teeth of the rotating shaft 33 and the gear 34 meshed therewith realize drastic downsizing of the device itself as well as installation of a tray 59 described hereafter.

The capsule ejection mechanism 30 includes a disc-shaped rotor 50 provided coaxially with the rotating shaft 33, four sets of sliders 60 placed on the lower surface side of the rotor 50 and rotating integrally with the rotor 50, and a cam member 70 protruding toward the item ejection port 21 side. The slider 60 rotates with the rotor 50. The cam member 70 is fixed to the base 31 and does not rotate. Also, a cap 36 for covering the rotating shaft 33 is attached on the top of the rotating shaft 33. A plurality of, three in this case, stirrers 80 for stirring the capsules C within the storage case 20 are attached on the top of the cap 36. Coil springs are typically used as the stirrers 80.

Figure 4:
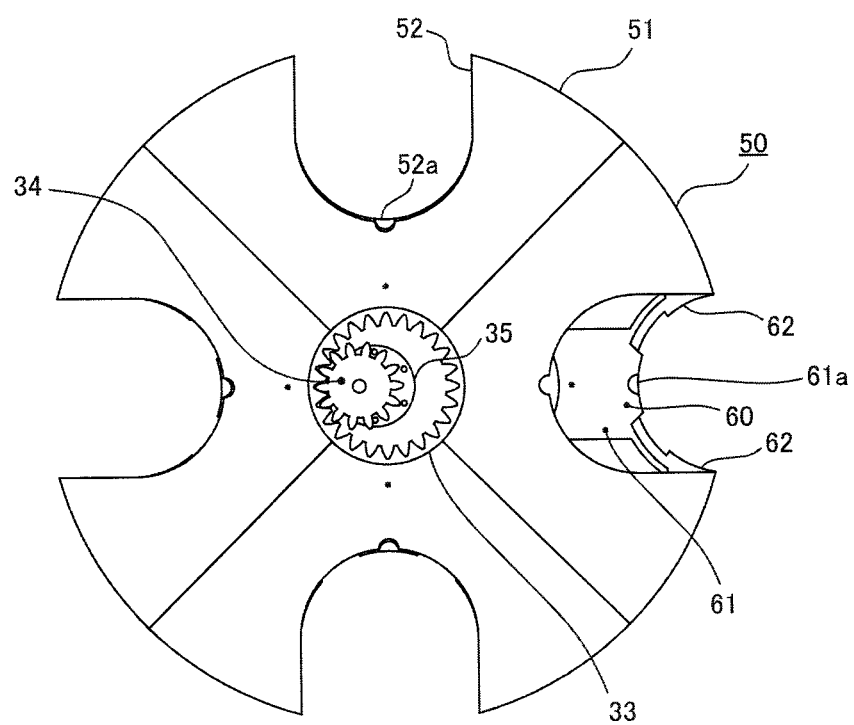
FIG. 4 is a top view of a rotor integrated into the ejection mechanism of FIG. 2.

As shown in FIG. 4, the rotor 50 includes a circular plate 51 and a plurality of, four in this case, substantially half-oval shaped item holders 52 opened radially outward and disposed in a distributed manner along the circumferential direction of the circular plate 51. An outer peripheral surface of the circular plate 51 is placed to be slightly spaced apart from an inner wall surface of the storage case 20. The item holders 52 are formed larger than the outer diameter of the capsule C and have the function of delivering the capsule C held in the item holder 52 in the rotary direction. Also, the central axis of the item holder 52 is formed along the radial direction of the rotating shaft 33. It is referred to as a push-out direction E for convenience. As shown in FIG. 3, linear guides 53 are provided in the circular plate 51 to guide the slider 60 along each item holder 52. The linear guides 53 are placed in parallel to the item push-out direction E. A notch 52a is provided at the end on the rotating shaft 33 side of the item holder 52.

The slider 60 is attached to the item holder 52 so as to be allowed to reciprocate in the push-out direction of the item holder 52, i.e., the radial direction, via the linear guides 53 and energized toward the rotating shaft 33 side by extension springs 54, where one end thereof is attached to the circular plate 51 side, and the other is attached to the slider 60.

The slider 60 includes a frame 61 placed on the rotating shaft 33 side and a pair of arms 62 extending from the frame 61 and forming a half-circle with the same diameter as that of the substantially half-oval opening portion (item holder 52) of the rotor 50.

At the center of the pair of arms 62, 62 in the frame 61, a projection 61a and a cam follower 61b are provided on the upper surface side and the lower surface side, respectively. The projection 61a is mated with the notch 52a when the slider 60 moves closest to the rotating shaft 33 side. The cam follower 61b slides along an outer edge of the cam member 70. The cam member 70 is fixed to the base 31 such that its convex portion protrudes toward the item ejection port 21. Because the cam member 70 does not rotate, as the slider 60 rotates with the rotor 50, the cam follower 61b slides along the outer edge of the cam member 70, causing the slider 60 to reciprocate along the radial direction. Because the convex portion of the cam member 70 is aligned with the item ejection port 21, as the item holder 52 is approaching the item ejection port 21 in orbit, the slider 60 moves radially outward, i.e., approaches the item ejection port 21 in the radial direction, whereas as the item holder 52 is moving away from the item ejection port 21 in orbit, the slider 60 moves to approach the rotating shaft 33.

Note that the rotor 50 is provided with an adjustment plate 55 for adjusting a waiting position of the slider 60. The adjustment plate 55 can rotate relative to the rotor 50, and also is configured to be able to be locked at stepwise angles or any angle with respect to the rotor 50. The adjustment plate 55 is substantially rectangular in shape and each side thereof is notched such that the distance between the rotating shaft 33 and the outer edge of the adjustment plate 55 changes stepwise or linearly. The outer edge of the adjustment plate 55 abut the projections 61a of the sliders 60. The angle of the adjustment plate 55 with respect to the rotor 50 is changed, thereby causing the waiting position of the slider 60 to be changed between the position nearby the rotating shaft 33 and the position distant from the rotating shaft 33. The opening of the item holder 52 of the rotor 50 is not closed by the slider 60 when the waiting position of the slider 60 is at a position proximate to the rotating shaft 33, whereas the opening of the item holder 52 of the rotor 50 is partially closed by the slider 60 when the waiting position of the slider 60 is at a position distant from the rotating shaft 33. According to the size of the capsule C, the angle of the adjustment plate 55 with respect to the rotor is changed to move the waiting position of the slider 60, thereby substantially adjusting the opening of the item holder 52 of the rotor 50, so that one capsule C per item holder 52 of the rotor 50 can be appropriately held.

A lever member 63 is attached to each of the arms 62, 62 in a pivotable manner about the vertical pivot axis. The lever member 63 includes a working portion 63a constituting a softly-curved long-shaft portion located on the item holder 52 side and a driving portion 63b provided on the opposite side of the pivot axis. The working portion 63a swings between a stored position S along the inner edge side of the item holder 52 and a push-out position P on the opening side of the item holder 52. The lever member 63 further includes a torsion bar spring (helical torsion spring) 64 for energizing the working portion 63a of the lever member 63 toward the stored position S side. Furthermore, on the outer edge of the lower surface of the circular plate 51 on the opening side of the item holder 52, projections 51a are provided in a downward direction. The projections 51a abut the driving portions 63b of the lever members 63, thereby causing the working portions 63a at the stored position S to pivot to the push-out position P against the energizing force of the springs 64.

Figure 5:
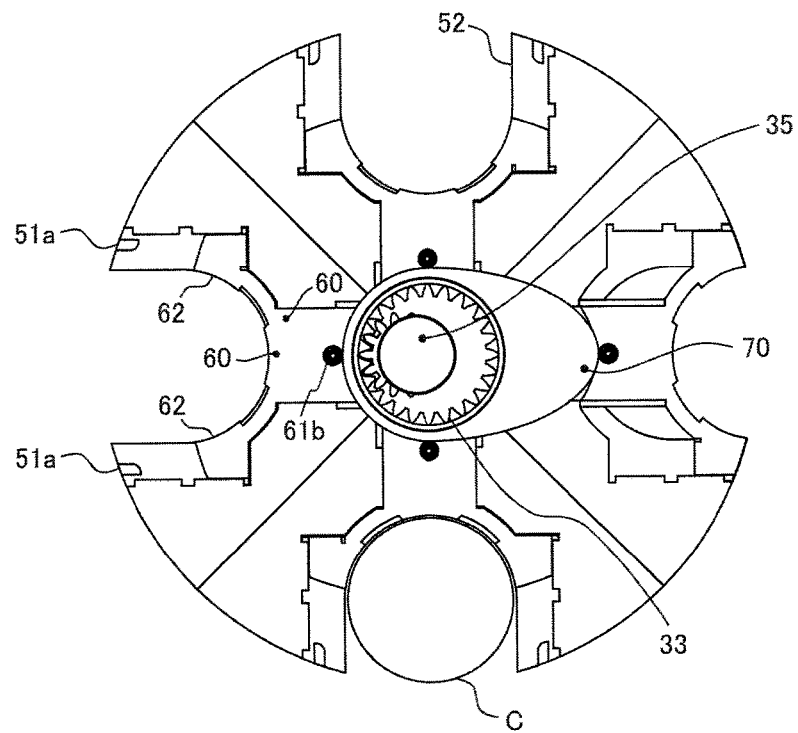
FIG. 5 is a bottom view of the rotor integrated into the ejection mechanism of FIG. 2.
Figure 6:
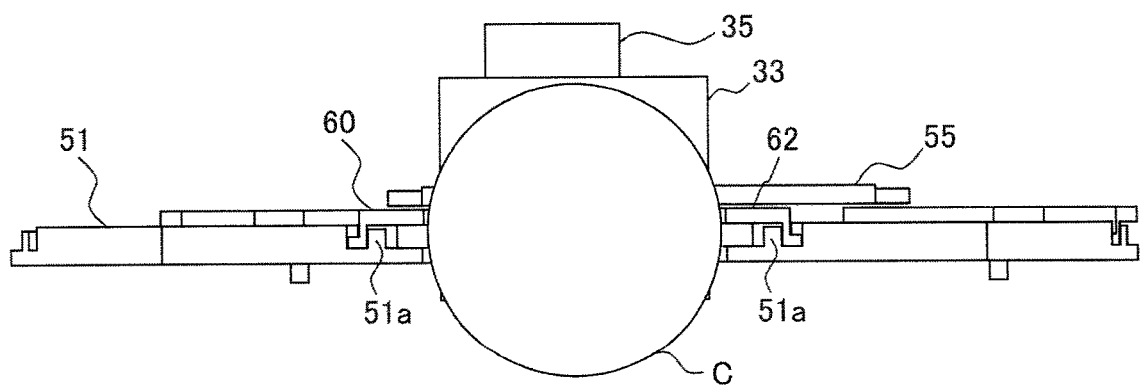
FIG. 6 is a side view of the rotor integrated into the ejection mechanism of FIG. 2.

As shown in FIG. 5, the cam member 70 protrudes toward the item ejection port 21 side, and has the function of moving the slider 60 attached to any of the item holders 52 radially outward because the protruded cam member 70 abuts the cam follower 61b of the slider 60 while the slider 60 is approaching the item ejection port 21. Note that as shown in FIG. 6, the center of the capsule C is positioned so as to approximately coincide with the center of the circular plate 51 in the thickness direction.

A tray 59 for receiving the capsule C is provided under each of the item holders 52 of the rotor 50. A bottom plate of the tray 59 is kept in a substantially-horizontal state of sloping outward and downward at any angle in the range of zero degree (horizontal) to 10 degree. The tray 59 rotates with the rotor 50 while keeping a capsule C being received. If the tray 59 does not exist, the capsule C held in the item holder 52 rolls and slides on a bottom plate of the storage case 20 with rotation of the rotor 50. The capsule C is a sphere with a pair of hemispheres engaged with each other, and a joint thereof is taped to avoid the split of the pair of hemispheres and the exposure of the item inside before a customer takes the capsule. Accordingly if the tray 59 is not provided, the capsule C rolls and slides on the bottom plate of the storage case 20, so there is a risk that the tape could be peeled off and the capsule C would be broken. The structure providing the tray 59 can avoid such a situation.

Figure 7:
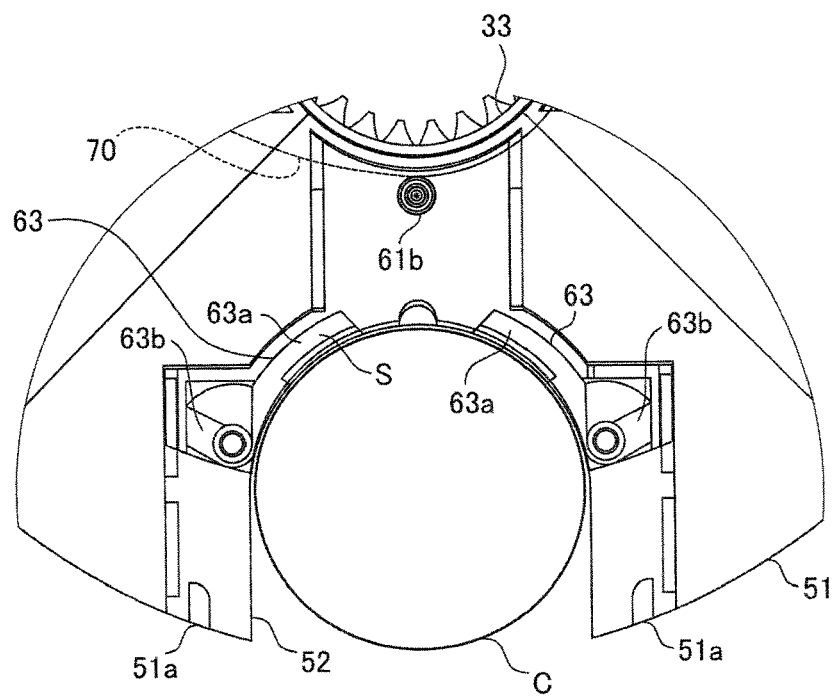
FIG. 7 is an illustration of an ejecting operation with the ejection mechanism of FIG. 2.
Figure 8:
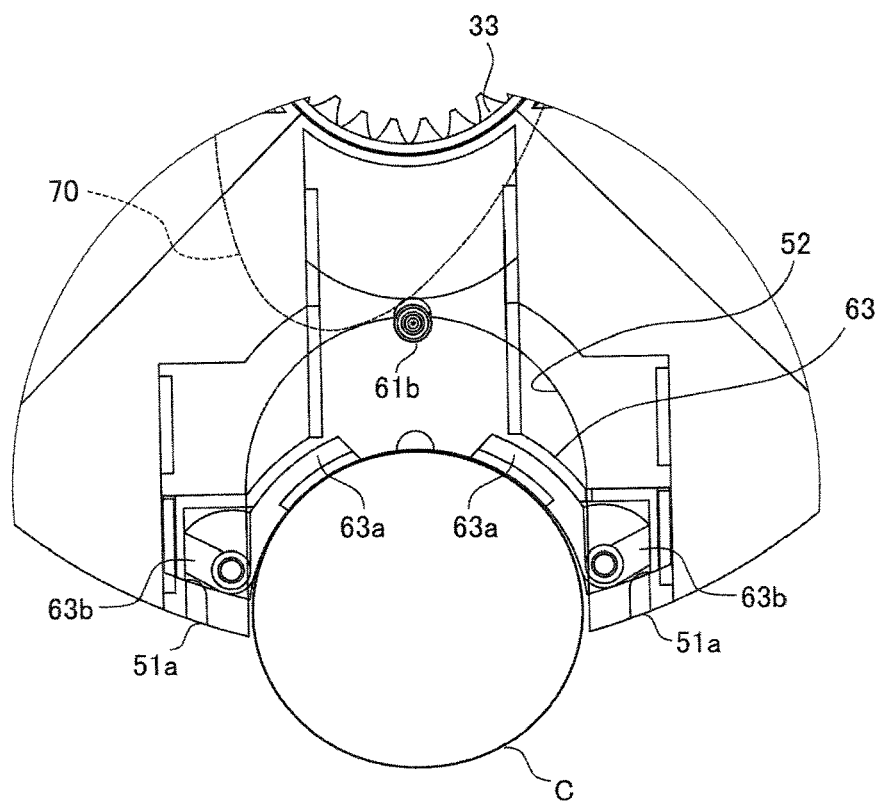
FIG. 8 is an illustration of the ejecting operation with the ejection mechanism of FIG. 2.
Figure 9:
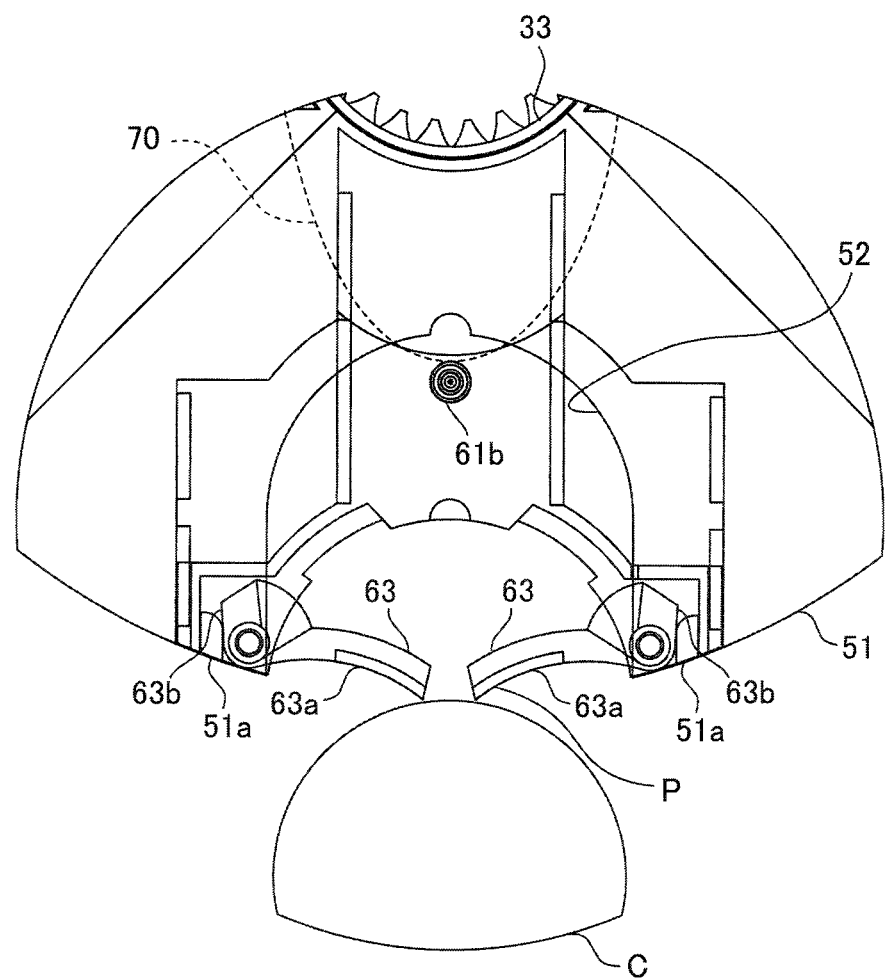
FIG. 9 is an illustration of the ejecting operation with the ejection mechanism of FIG. 2.

A method for dispensing capsules C with the item dispensing device 1 configured in such a manner will be described with reference to FIGS. 7 to 9 showing the lower surface side of the circular plate 51. When a customer operates the item dispensing device 10 for purchase or the like from outside, the motor 35 rotates and the gear 34 causes the rotating shaft 33 to rotate. As shown in FIG. 7, a certain item holder 52 retains a capsule C. At the position that the item holder 52 is not facing the item ejection port 21, the slider 60 is located on the rotating shaft 33 side because the cam member 70 does not push out the cam follower 61b.

As shown in FIG. 8, when the rotating shaft 33 rotates and the item holder 52 approaches the item ejection port 21, the slider 60 is pushed out in the push-out direction because the cam member 70 pushes out the cam follower 61b in the radial direction. The projections 51a abut the driving portions 63b, thereby causing the working portion 63a to pivot toward the push-out position P to push out the capsule C from the item holder 52.

As shown in FIG. 9, when the rotating shaft 33 rotates and the item holder 52 faces the item ejection port 21, the slider 60 is further pushed out in the push-out direction because the cam member 70 further pushes out the cam follower 61b in the radial direction. The projections 51a abut the driving portions 63b, thereby causing the working portions 63a to pivot to the push-out position P to push the capsule C completely out of the item holder 52.

In this way, the capsule C pushed out through the item ejection port 21 is dispensed from the storage case 20, and guided through the guide pipe 4 to the item ejection unit 3 so as to be taken out by a customer. Considering a single item dispensing device 10, being provided in the side surface of the storage case 20, the item ejection port 21 needs not to be provided under the storage case 20, so the entire device can be configured with approximately the same height as that of the storage case 20. Therefore, this makes it possible to increase the storing capacity without increasing the height of the entire device. Also, when an item dispensing device 1 is configured with a plurality of item dispensing device 10 stacked, the height of the entire device can be reduced.

Figure 21:
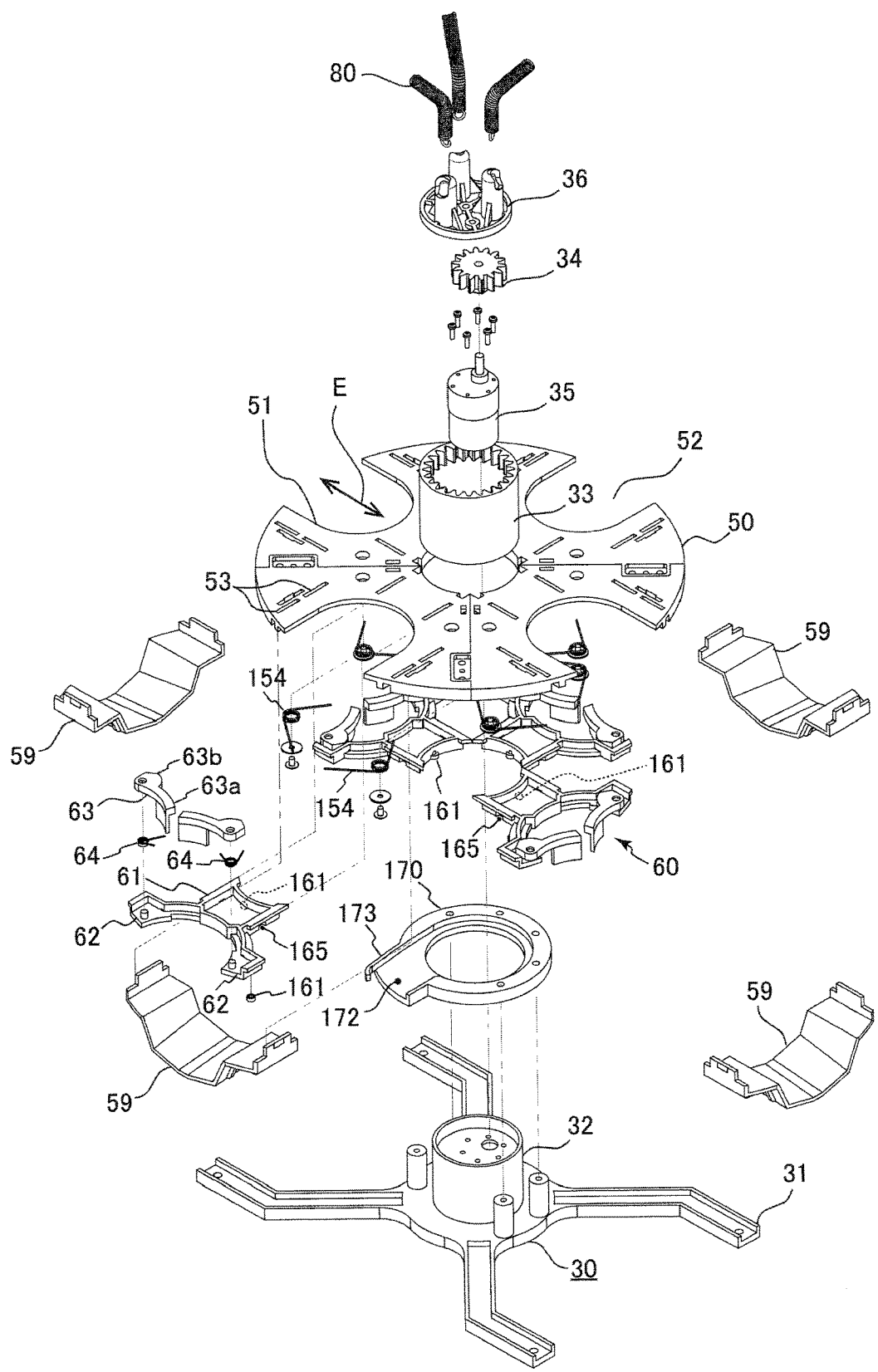
FIG. 21 is an exploded perspective view of a variation of the ejection mechanism of FIG. 3.
Figure 22:
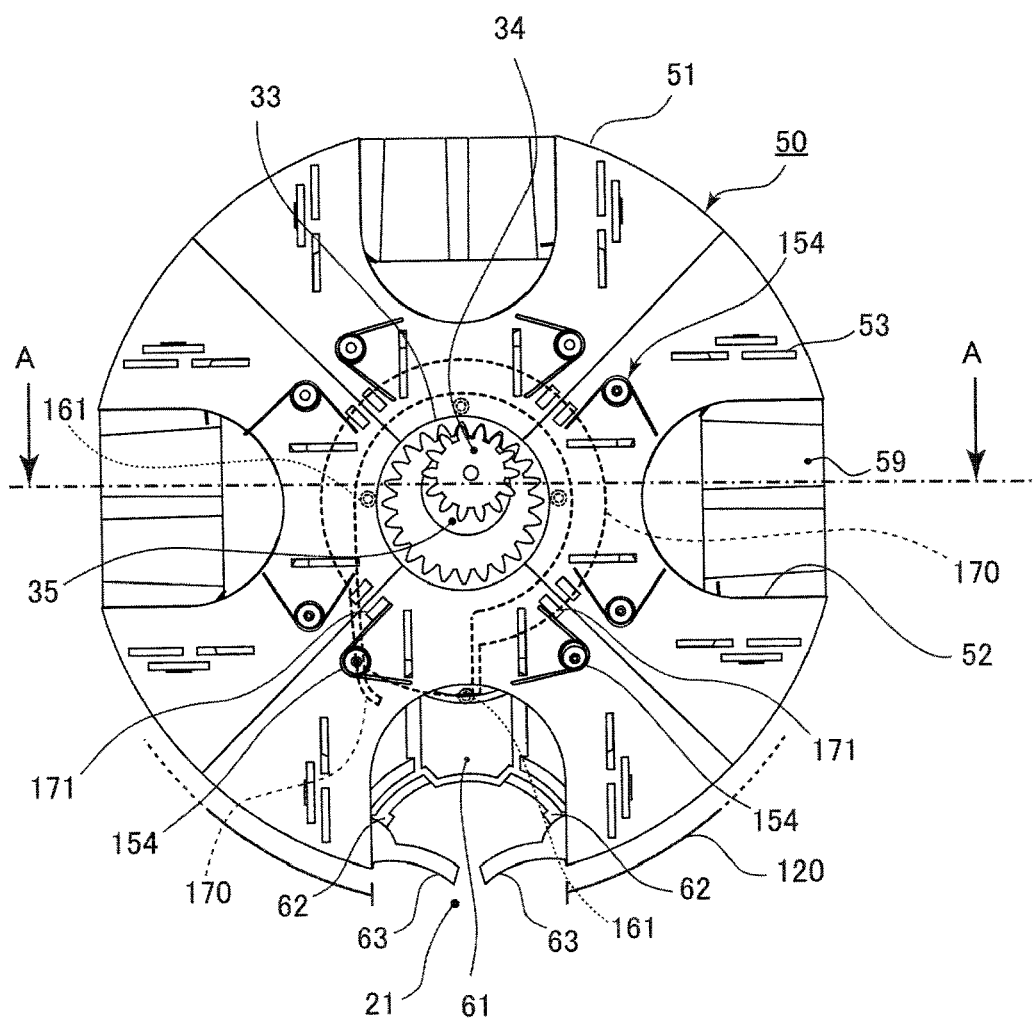
FIG. 22 is a top view of the ejection mechanism of FIG. 21.
Figure 23:
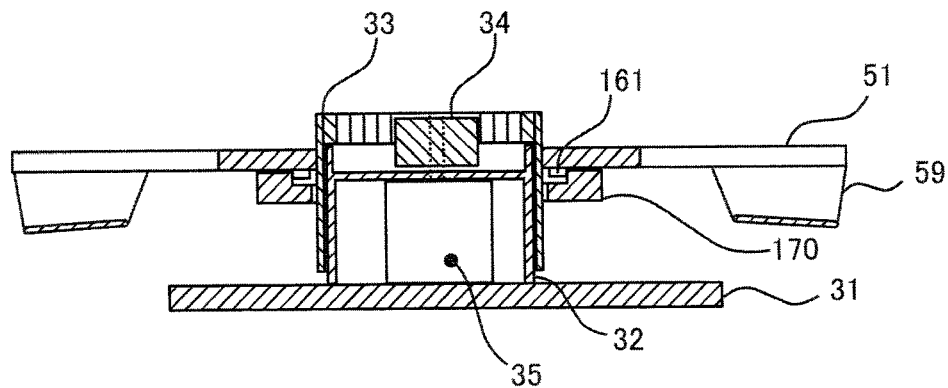
FIG. 23 is a side view of the ejection mechanism of FIG. 21.

Note that in the foregoing, the slider 60 has been described as being attached to the linear guides 53 in a radially reciprocable manner, and being energized by the extension springs 54 toward the rotating shaft 33 side, i.e., inward, however, as shown in FIGS. 21 to 23, each slider 60 may be energized, from left and right by a pair of torsion bar springs 154 with the same spring constant, in the direction that pushes the capsule C outward. The pair of torsion bar springs 154 is pivotally supported at symmetric positions on the back surface of the circular plate 51 of the rotor 50. In the compressed state of the torsion bar spring 154, one end thereof is pressed against a protrusion 171 of the circular plate 51 and the other is inserted into a spring reception 165 in the side surface of the slider 60. Note that the spring constant of the torsion bar springs 154 is set to a higher value than that of the torsion bar springs 64 such that when the slider 60 is pushed outward by the torsion bar springs 154, the lever members 63 at the tip of the slider 60 pivot to the push-out position P against the torsion bar springs 64 energizing the lever members 63 toward the stored position S thereof.

A columnar protrusion (cam follower) 161 is provided on the rotating shaft side of the back surface of the slider 60. For example, a bearing is used as the cam follower 161. The cam follower 161 slides, with rotation of the rotor 50, along the inner peripheral surface of a rail 170 fixed to the base 31. The rail 170 is formed in a ring shape and partially opened. The opening width (opening angle) of that opening 172 is substantially half the opening width (opening angle) of the item ejection port 21 and the upstream end of the opening 172 is aligned with the center of the opening of the item ejection port 21. A linear or softly-curved guide rail 173 is connected to the downstream end of the opening 172 of the rail 170 so as to be tangential to the rail 170.

Figure 24:
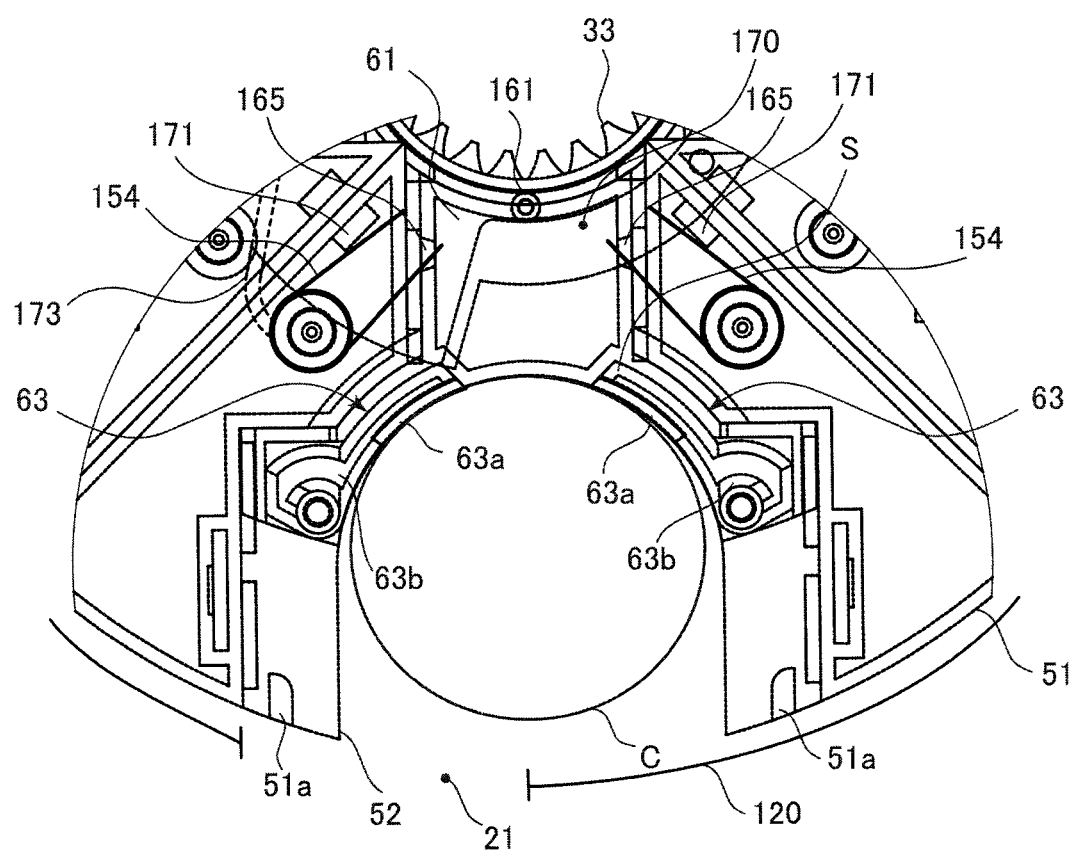
FIG. 24 is an illustration of an ejecting operation with the ejection mechanism of FIG. 21.
Figure 25:
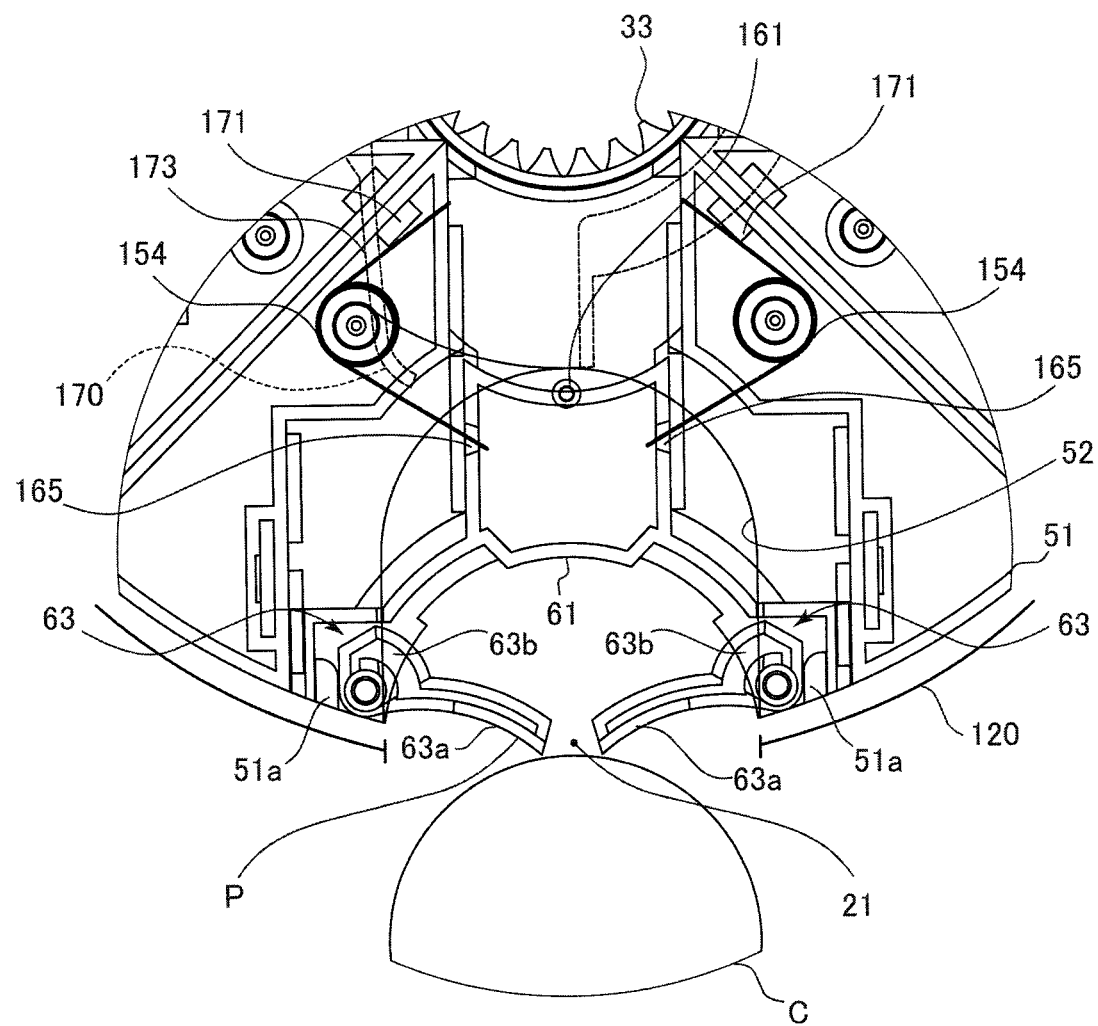
FIG. 25 is an illustration of the ejecting operation with the ejection mechanism of FIG. 21.

As shown in FIG. 24, when the torsion bar springs 154 are compressed, the cam follower 161 is pressed against the inner peripheral wall surface of the rail 170. While the cam follower 161 is moving along the rail 170, the slider 60 is being kept at the ordinary position (waiting position) closest to the rotation center. As shown in FIG. 25, when the cam follower 161 reaches the opening 172 of the rail 170 with rotation of the rotor 50, the torsion bar springs 154 are released in a moment to repel the slider 60 radially outward with great force. Along with the movement of the slider 60, the lever members 63 at the tip thereof pivots from the stored position thereof to the push-out position. The movement of the slider 60 and the pivotal motion of the lever members 63 cause the capsule C held in the item holder 52 of the rotor 50 to be forced out in a substantially horizontal direction with great force to be ejected outside through the item ejection port 21.

Figure 26:
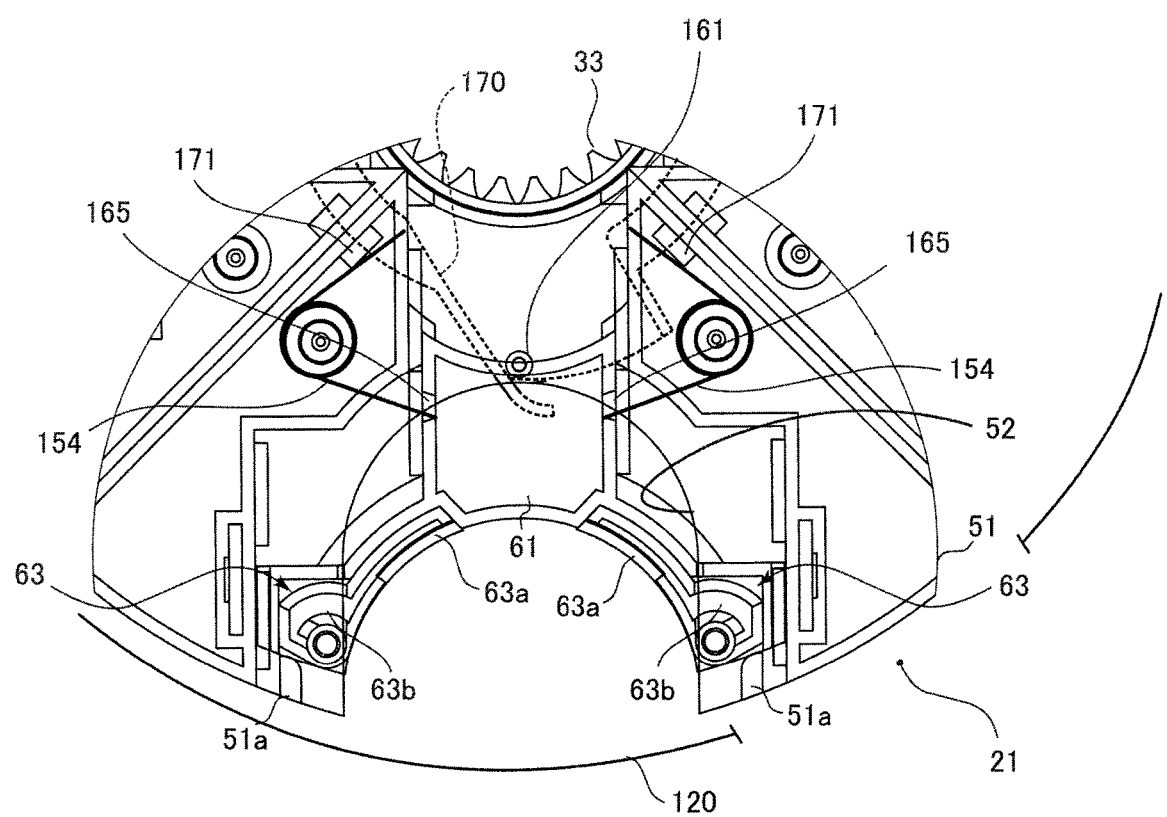
FIG. 26 is an illustration of the ejecting operation with the ejection mechanism of FIG. 21.
Figure 27:
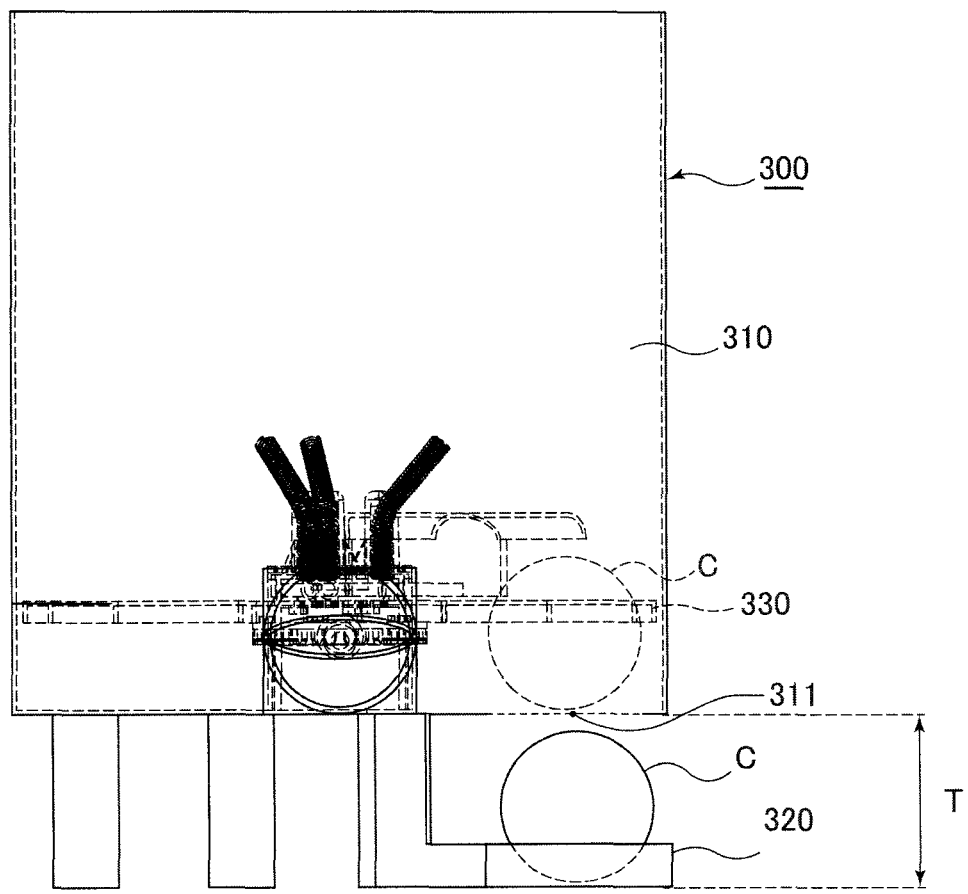
FIG. 27 is a side view of a typical item dispensing device.

As shown in FIG. 26, as the rotor 50 further rotates, the cam follower 161 abuts the guide rail 173 and slides along the inner wall surface of the guide rail 173, thereby gradually approaching the rotation center. Then, the cam follower 161 returns to the ring-shaped rail 170 from the guide rail 173.

With this structure, the springs 154 in the compressed state are released in a moment and the instantaneous repulsive force thereof can cause the capsule C to be forced out in a substantially-horizontal direction with great force. Therefore, not only spherical capsules C but also ellipsoidal or other non-spherical capsules C can be ejected through the item ejection port 21 without unexpected stops.

FIGS. 10 to 14 show an item dispensing device 100 according to the second embodiment of the present invention. Note that the item dispensing device 100 may be stacked into a single item dispensing device 1 as shown in FIG. 1 or used as a standalone device.

Figure 10:
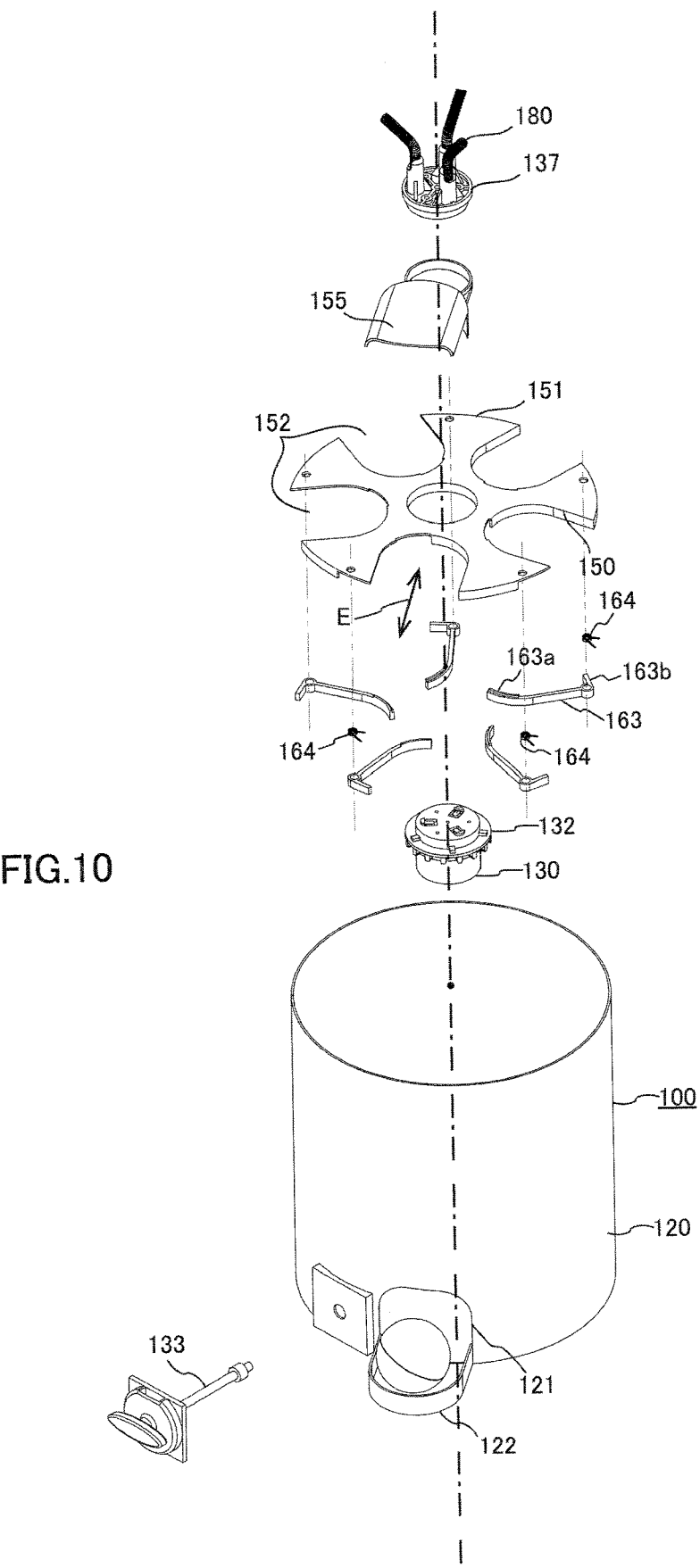
FIG. 10 is an exploded perspective view of an item dispensing device according to the second embodiment of the present invention.

As shown in FIG. 10, the item dispensing device 100 includes a bottomed-cylindrical storage case 120 for storing a plurality of capsules C for containing items, and a capsule ejection mechanism 130 provided within the storage case 120. A single item ejection port 121, which is slightly larger than the capsule C, is formed in a lower side-wall of the storage case 120.

Figure 11:
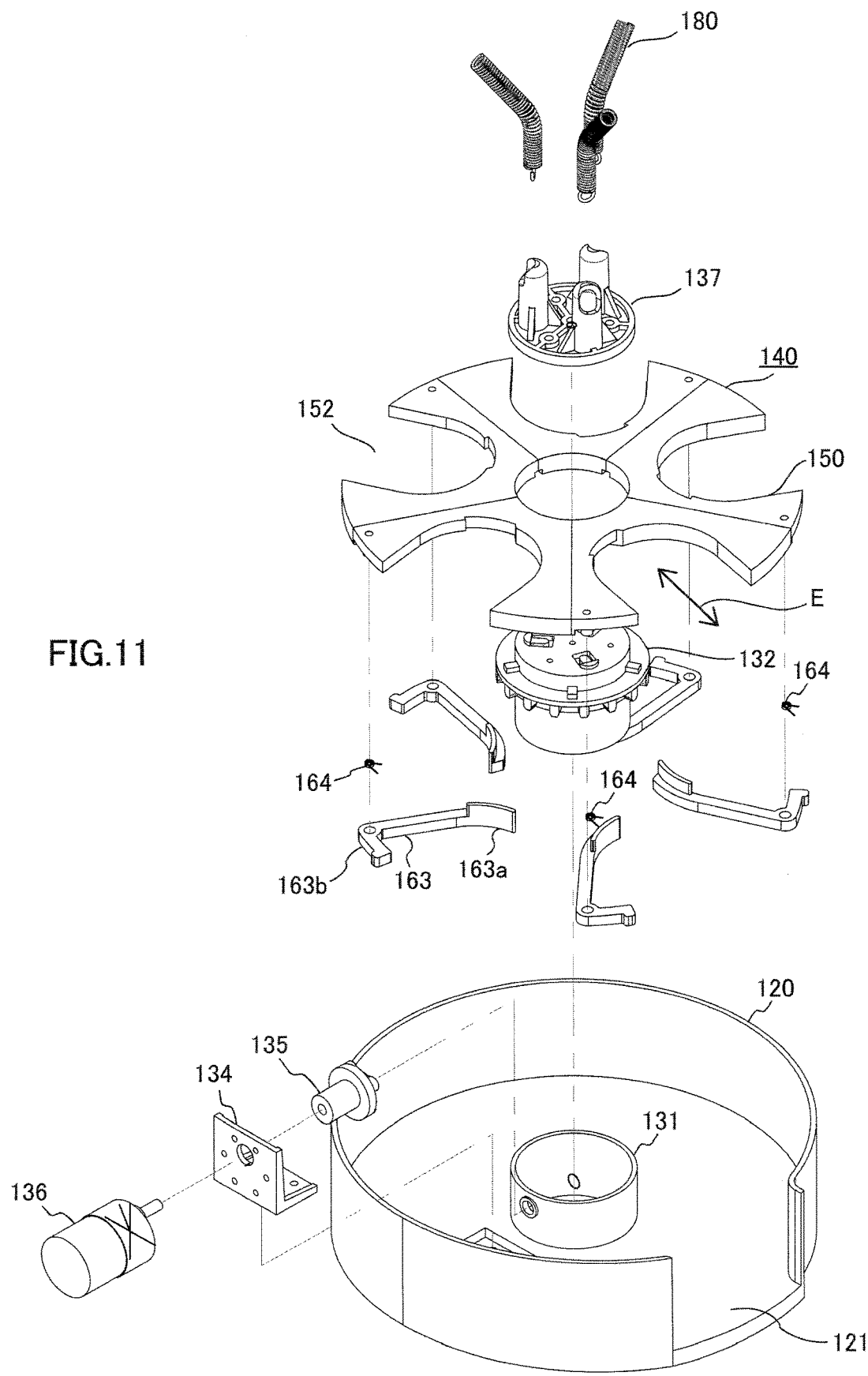
FIG. 11 is an exploded perspective view of an ejection mechanism integrated into the item dispensing device of FIG. 10.

As shown in FIG. 11, the capsule ejection mechanism 130 includes a base 131 provided on the bottom of the storage case 120, a gear 132 mounted on the base 131 in a rotatable manner about the vertical axis, and a rotating handle 133 for rotating the gear 132. Note that the rotating handle 133 may be replaced with a driving motor attached to the base 131 via a bracket 134 and turning force transmission mechanism 135 as shown in FIG. 11.

The capsule ejection mechanism 130 includes a rotor 150 attached to the gear 132. Also, the rotor 150 is fitted into the top of the gear 132 and fastened with a cap 137. A plurality of, three in this case, stirrers 180 for stirring the capsules C within the storage case 120 are mounted on the cap 137. The stirrers 180 are constituted of, for example, coil springs.

The rotor 150 includes a disk 151 and five item holders 152 provided intermittently along the circumferential direction of the disk 151 and opened on the outer circumferential side. The outer peripheral surface of the disk 151 is placed to be slightly spaced apart from the inner wall surface of the storage case 120. The item holders 152 are formed larger than the outer diameter of the capsule C and have the function of delivering the capsule C in the rotary direction by engaging with the center of the capsule C within the storage case 120. Also, the central axis of the item holder 152 is formed along the radial direction of the disk 151. It is referred to as a push-out direction E for convenience. A cover 155 is placed above the item ejection port 121 to prevent, after one capsule is ejected, another capsule C located above from coming down to be ejected through the item ejection port 121. The cover 155 is supported by the inner wall of the storage case 120 or the base 131. The cover 155 is aligned with the item ejection port 121.

In the proximity of the item holder 152 in the disk 151, a lever member 163 is mounted in a pivotable manner about the vertical pivot axis. The lever member 163 has a working portion (long-shaft portion) 163*a* located on the item holder 152 side and a driving portion (short-shaft portion) 163*b* located on the opposite side of the pivot axis. The working portion 163*a* and driving portion 163*b* form a substantially L-shape and the lever member 163 is pivotally supported about a bending portion thereof. The working portion 163*a* is pivotally supported so as to be able to pivot between a stored position S along an inner edge of the item holder 152 and a push-out position P on the opening side of the item holder 52. The lever member 163 further includes a spring 164 for energizing the working portion 163*a* of the lever member 163 to the push-out position P side. The driving portion 163*b* abuts the inner wall surface of the storage case 120, thereby moving the working portion 163*a* to the stored position S against the energizing force of the spring 164.

Figure 12:
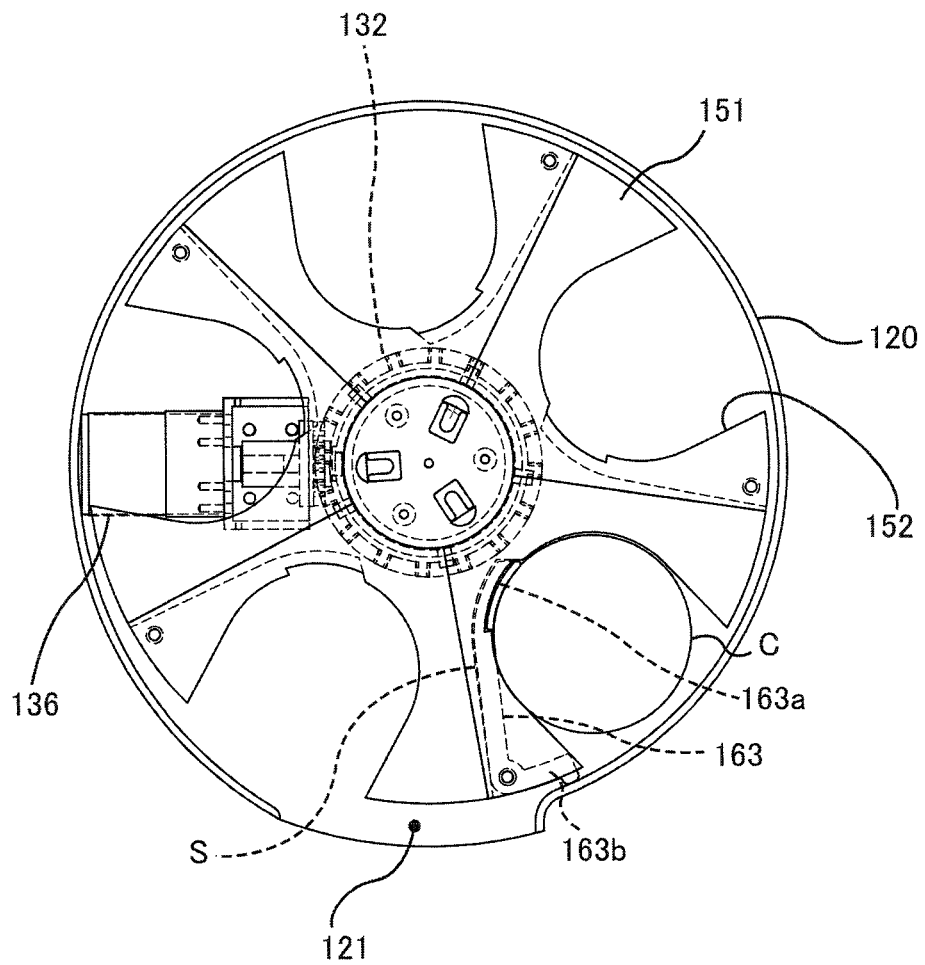
FIG. 12 is an illustration of an ejecting operation with the ejection mechanism of FIG. 11.

A method for dispensing capsules C with the item dispensing device 100 configured in such a manner will be described with reference to FIGS. 12 to 14. When a customer operates the item dispensing device 100 for purchase or the like from outside, the rotating handle 133 or driving motor 136 rotates, and the gear 132 causes the disk 151 to rotate. As shown in FIG. 12, a certain item holder 152 is holding a capsule C. At a position that the item holder 152 is not facing the item ejection port 121, the driving portion 163b abuts the inner wall surface of the storage case 120, thereby placing the working portion 163a to the stored position S against the energizing force of the spring 164.

Figure 13:
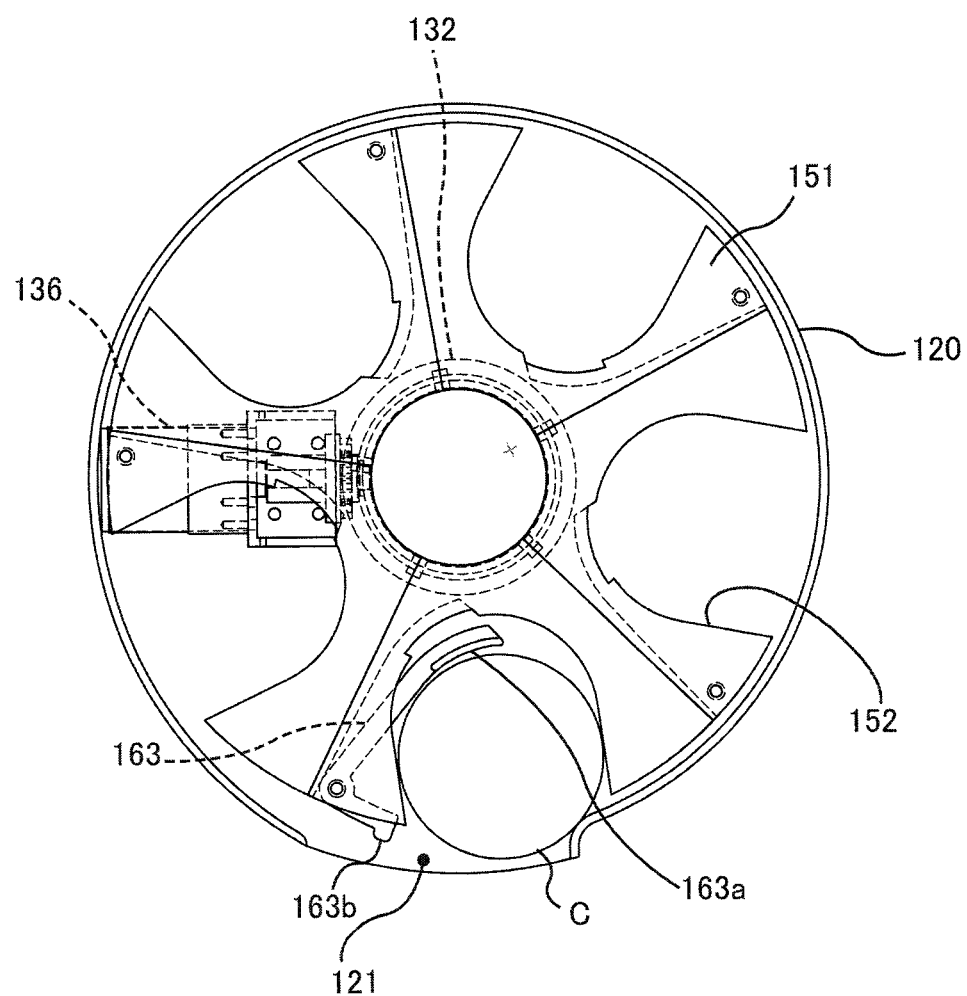
FIG. 13 is an illustration of the ejecting operation with the ejection mechanism of FIG. 11.

As shown in FIG. 13, when the disk 151 rotates and the item holder 152 approaches the item ejection port 121, the driving portion 163b are released from the abutment to the inner wall surface of the storage case 120 and the energizing force of the spring 164 causes the working portion 163a to pivot toward the push-out position P to push the capsule C from the item holder 152.

Figure 14:
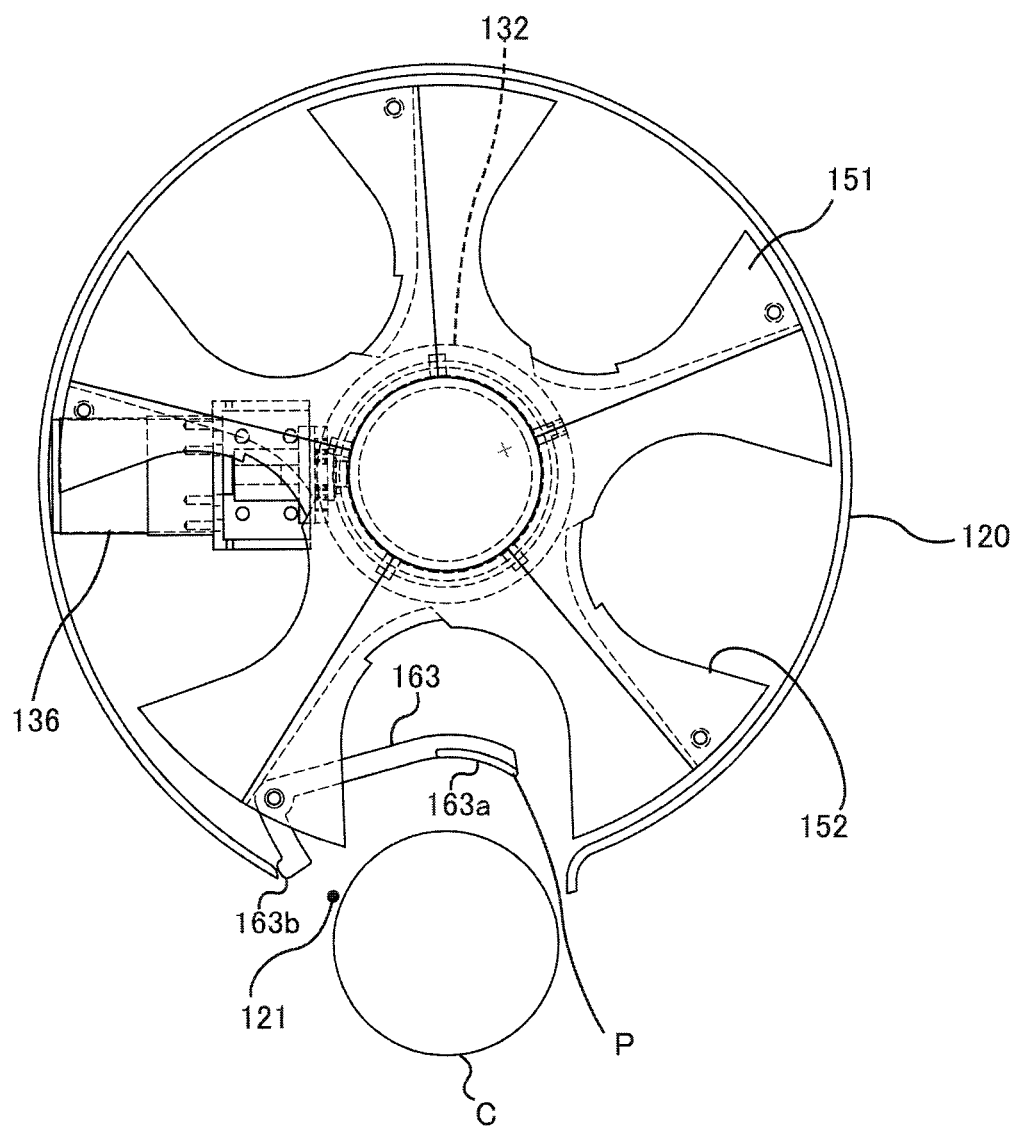
FIG. 14 is an illustration of the ejecting operation with the ejection mechanism of FIG. 11.

As shown in FIG. 14, when the disk 151 rotates and the item holder 152 faces the item ejection port 121, the driving portion 163b is completely released from the abutment to the inner wall surface of the storage case 120 and the energizing force of the spring 164 causes the working portion 163a to pivot to the push-out position P to push the capsule C completely out of the item holder 152.

In this way, the capsule C pushed out of the item ejection port 121 is dispensed from the storage case 120 and guided to a receiver 122 to be taken out by the customer. Being provided in a side surface of the storage case 120 in the item dispensing device 100, the item ejection port 121 needs not to be provided under the storage case 120, so the entire device can be configured with approximately the same height as that of the storage case 120. Therefore, this makes it possible to increase the storing capacity without increasing the height of the entire device.

FIGS. 15 to 20 show an item dispensing device 200 according to the third embodiment of the present invention. Note that the item dispensing device 200 may be stacked into the item dispensing device 1 as shown in FIG. 1 or used as a standalone device.

Figure 15:
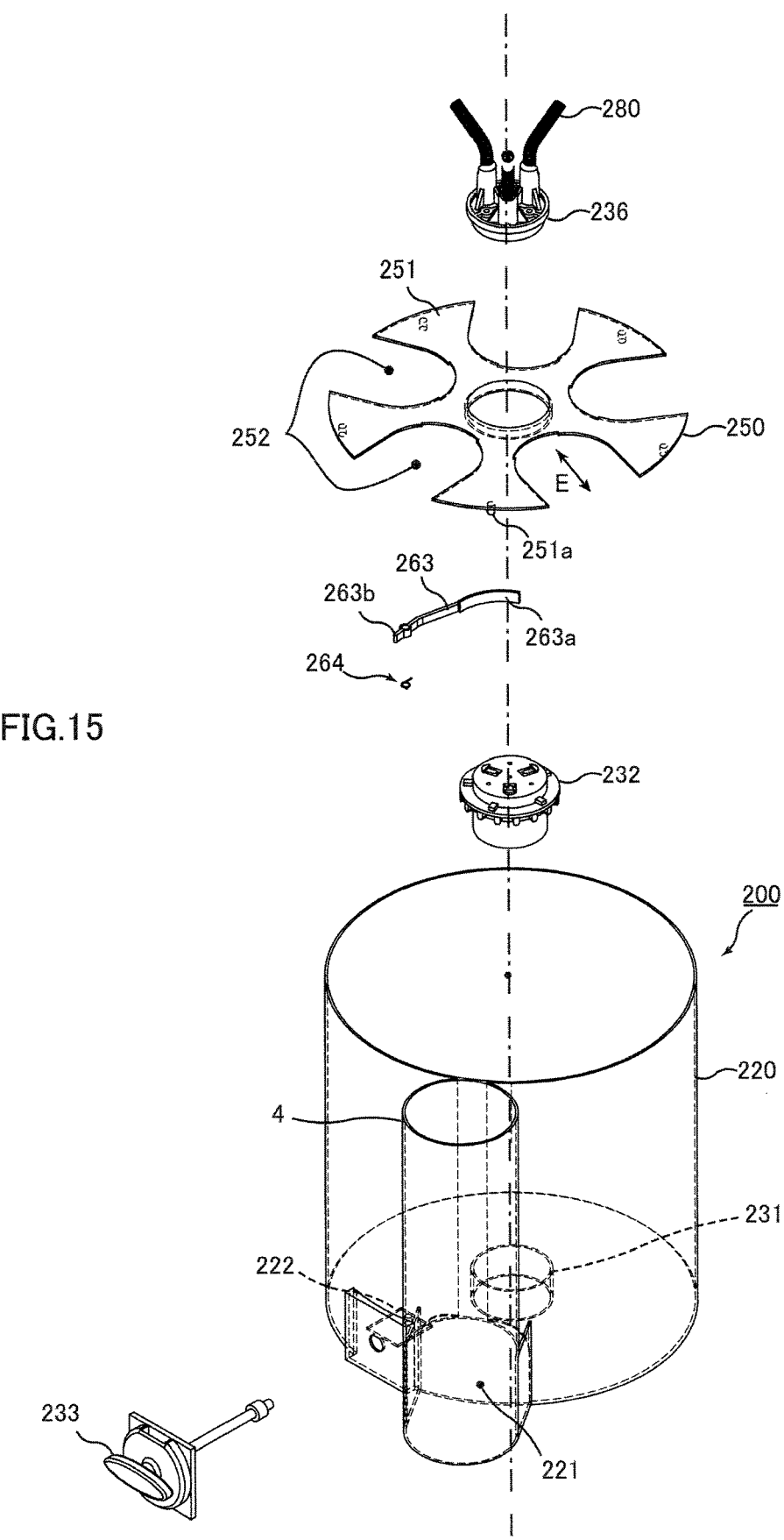
FIG. 15 is an exploded perspective view of an item dispensing device according to the third embodiment of the present invention.

As shown in FIG. 15, the item dispensing device 200 includes a bottomed-cylindrical storage case 220 for storing a plurality of capsules C, and a capsule ejection mechanism 230 provided within the storage case 220. An item ejection port 221 formed slightly larger than the capsule C is provided in a lower side-surface of the storage case 220 and connected to a guide pipe 4.

The capsule ejection mechanism 230 includes a base 231 provided on the bottom of the storage case 220, a gear 232 mounted on the base 231 in a rotatable manner about the vertical axis, and a rotating handle 233 for rotating the gear 232. Note that the rotating handle 233 may be replaced with a driving motor or the like.

The capsule ejection mechanism 230 includes a rotor 250 attached to the gear 232. A cap 236 for covering the gear 232 is attached to the gear 232. A plurality of, three in this case, stirrers 280 for stirring the capsules C within the storage case 220 are mounted on the cap 236. For example, coil springs are used as the stirrers 280.

The rotor 250 includes a disk 251 and five item holders 252 provided intermittently along the circumferential direction of the disk 251 and opened on the outer circumferential side. An outer peripheral surface of the disk 251 is placed to be slightly spaced apart from an inner wall surface of the storage case 220. The item holders 252 are formed larger than the outer diameter of the capsule C and have the function of delivering the capsule C in the rotary direction by engaging with the center of the capsule C within the storage case 220. Also, the central axis of each item holder 252 is formed along the radial direction of the disk 251. It is referred to as a push-out direction E for convenience. Five projections 251a are provided between their respective pairs of the item holders 252 on the lower surface of the disk 251.

Figure 16:
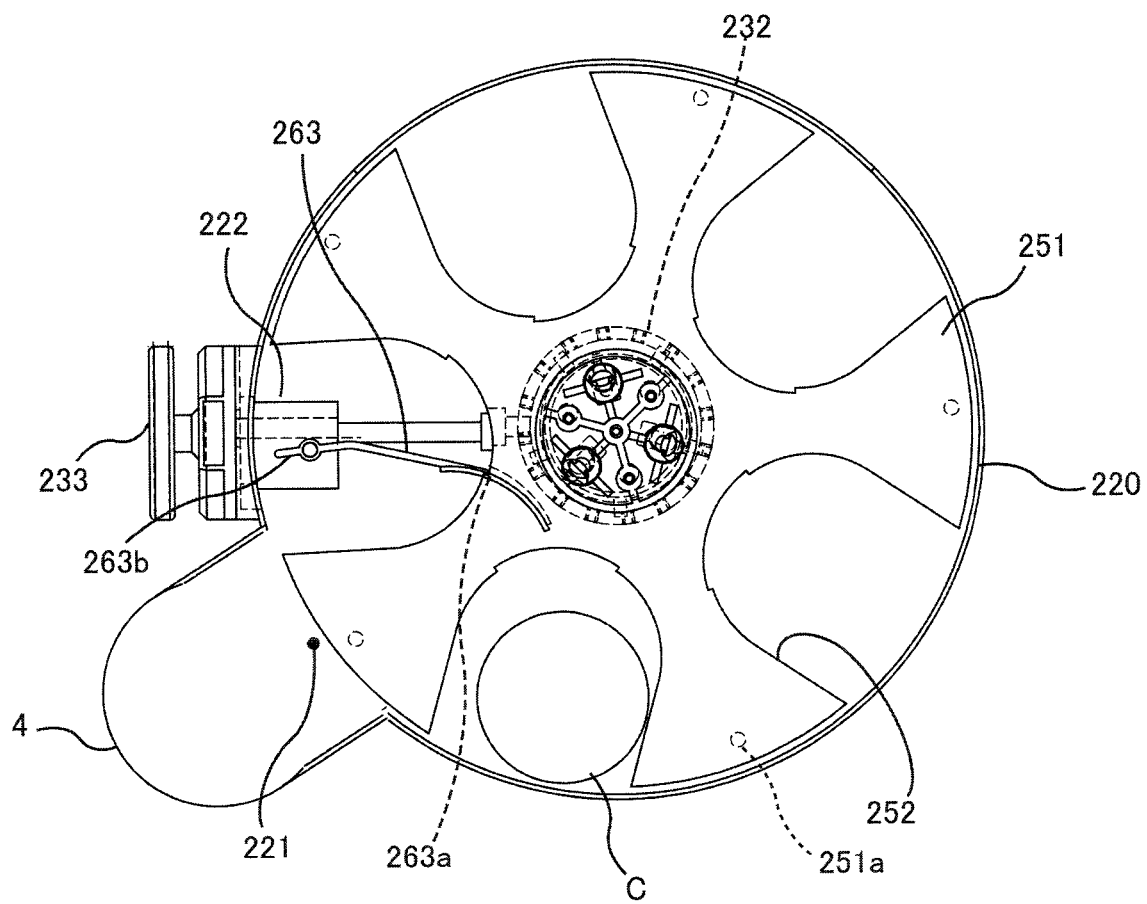
FIG. 16 is a plan view of the item dispensing device of FIG. 15.
Figure 17:
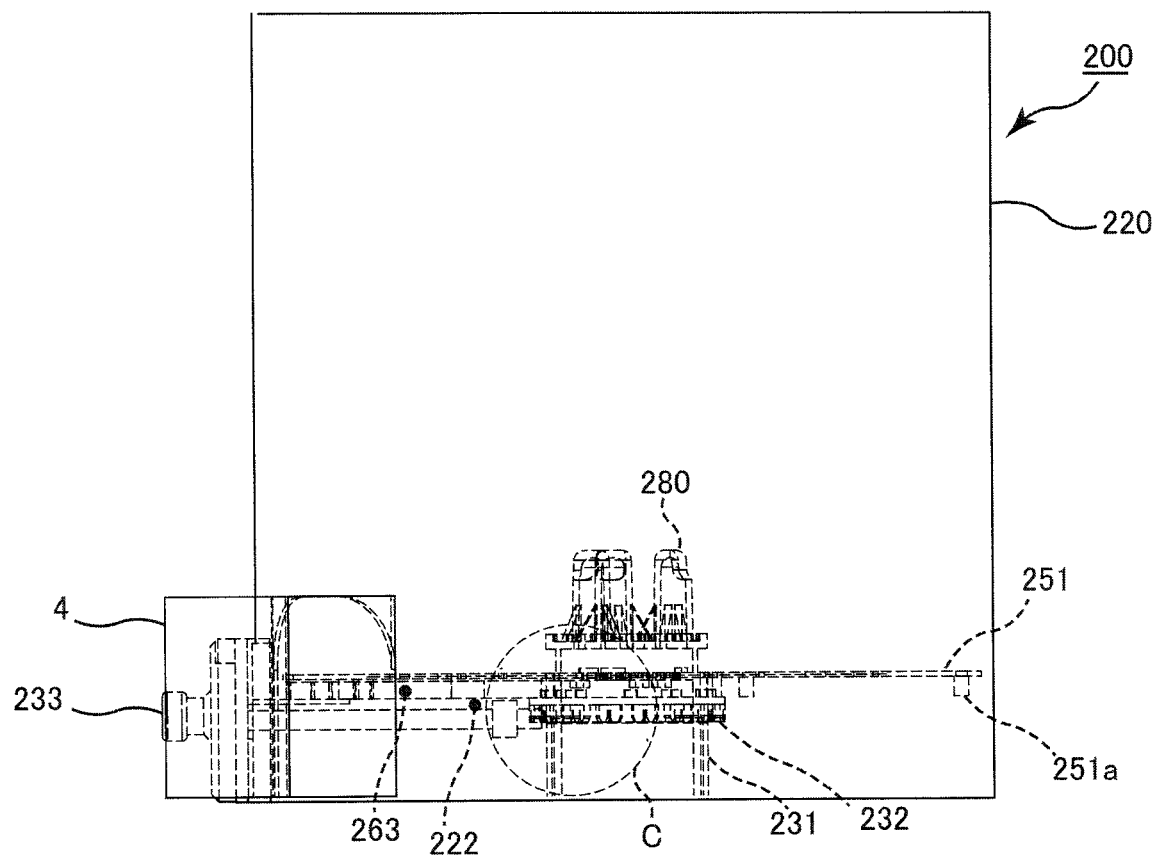
FIG. 17 is a side view of the item dispensing device of FIG. 15.

As shown in FIGS. 16 and 17, a bracket 222 is fixed to an inner wall of the storage case 220, while projecting inward. A lever member 263 is attached to the bracket 222 in a pivotable manner about the vertical pivot axis. The lever member 263 is a linear bar configured with a working portion 263a constituting a softly-curved long-shaft portion located on the item holder 252 side, and a driving portion 263b constituting a short-shaft portion located on the opposite side of the pivot shaft. The working portion 263a is pivotally supported to pivotably move between a stored position S along an inner edge of the item holder 252 and a push-out position P on the opening side of the item holder 252. The lever member 263 further includes a spring 264 for energizing the working portion 263a of the lever member 263 to the stored position S side. The driving portion 263b engages with the protrusion 251a of the disk 251, thereby moving the working portion 263a to the push-out position P against the energizing force of the spring 264.

Figure 18:
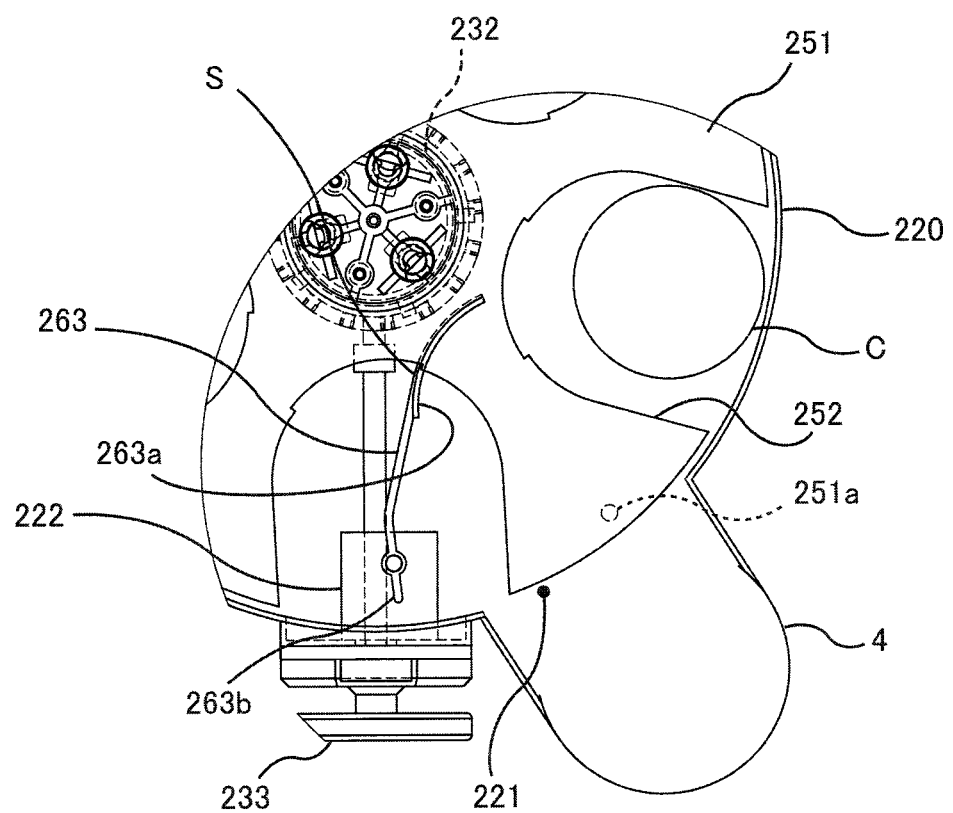
FIG. 18 is an illustration of an ejecting operation with the ejection mechanism of FIG. 15.

A method for dispensing capsules C with the item dispensing device 200 configured in such a manner will be described with reference to FIGS. 18 to 20. When a customer operates the item dispensing device 200 for purchase or the like from outside, the rotating handle 233 rotates and the gear 232 causes the disk 251 to rotate. As shown in FIG. 18, a certain item holder 252 is holding a capsule C. At a position that the item holder 252 is not facing the item ejection port 221, the driving portion 263b places the working portion 263a to the stored position S with the energizing force of the spring 264.

Figure 19:
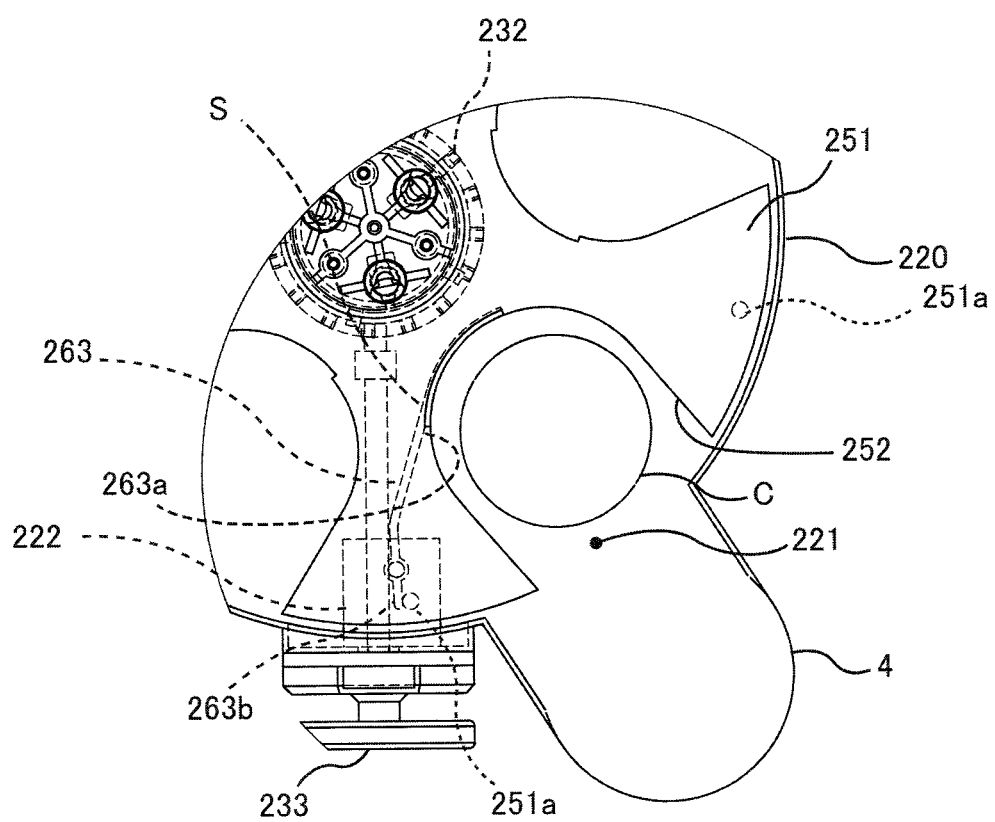
FIG. 19 is an illustration of the ejecting operation with the ejection mechanism of FIG. 15.

As shown in FIG. 19, when the disk 251 rotates and the item holder 252 approaches the item ejection port 221, the projection 251a engages with the driving portion 263b.

Figure 20:
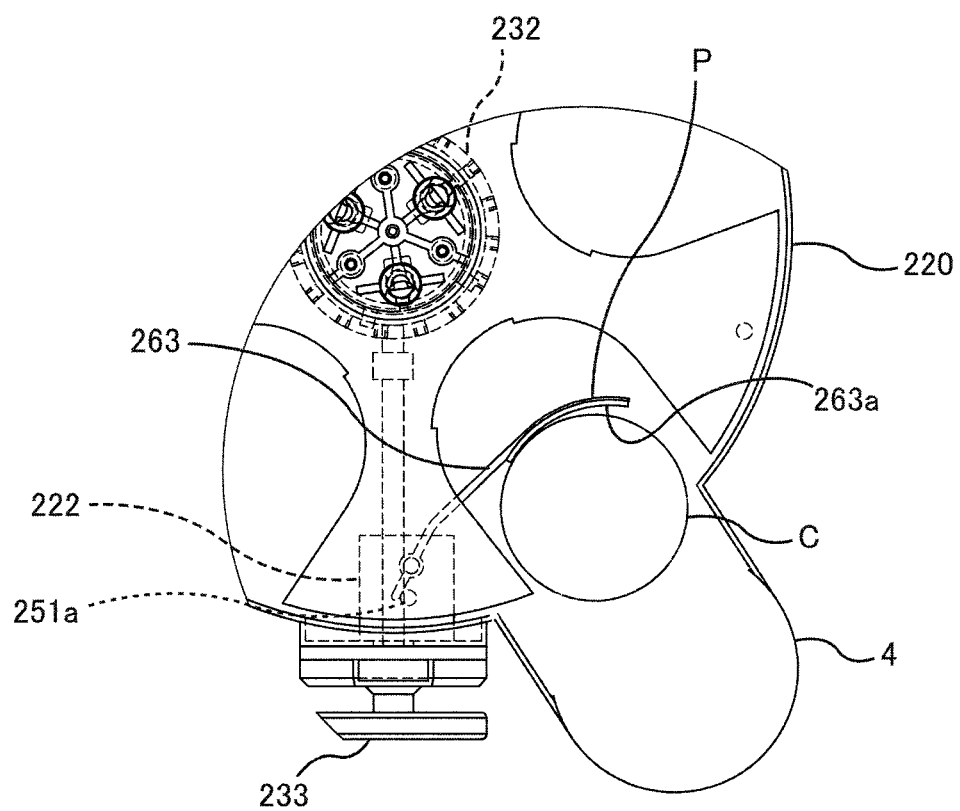
FIG. 20 is an illustration of the ejecting operation with the ejection mechanism of FIG. 15.

As shown in FIG. 20, when the disk 251 rotates and the item holder 152 faces the item ejection port 121, the projection 251a causes the driving portion 263b to further pivot, thereby causing the working portion 263a to pivot toward the push-out position P against the energizing force of the spring 264 and push the capsule C completely out of the item holder 252. Note that when the disk 251 further rotates, the projection 251a is disengaged from the driving portion 263b, which returns the working portion 263a to the stored position S with the energizing force of the spring 264.

In this way, the capsule C pushed out through the item ejection port 221 is dispensed from the storage case 220 and guided to the guide pipe 4 to be taken out by the customer. In the item dispensing device 200, the item ejection port. 221 is provided in a side surface of the storage case 220 and needs not to be provided under the storage case 220, so the entire device can be configured with approximately the same height as that of the storage 120. Therefore, this makes it possible to increase the storing capacity without increasing the height of the entire device.

It should be appreciated that the present invention is not limited to each of the embodiments described above, but can be applied to various types of item dispensing devices.

REFERENCE SIGNS LIST

1 . . . item dispensing device, 10 . . . item dispensing device, 20 . . . storage case, 21 . . . item ejection port, 30 . . . capsule ejection mechanism, 33 . . . rotating shaft, 36 . . . cap, 50 . . . rotor, 51 . . . circular plate, 51a . . . projection, 52 . . . item holder, 53 . . . linear guide, 60 . . . slider, 61 . . . frame, 61b . . . cam follower, 62 . . . arm, 63 . . . lever member, 63a . . . working portion, 63b . . . driving portion, 64 . . . spring, 70 . . . cam member, 80 . . . stirrer, 100 . . . item dispensing device, 120 . . . storage case, 121 . . . item ejection port, 130 . . . capsule ejection mechanism, 136 . . . driving motor, 137 . . . cap, 150 . . . rotor, 151 . . . disk, 152 . . . item holder, 163 . . . lever member, 163a . . . working portion, 163b . . . driving portion, 164 . . . spring, 180 . . . stirrer, 200 . . . item dispensing device, 220 . . . storage case, 221 . . . item ejection port, 230 . . . capsule ejection mechanism, 236 . . . cap, 250 . . . rotor, 251 . . . disk, 251a . . . projection, 252 . . . item holder, 263 . . . lever member, 263a . . . working portion, 263b . . . driving portion, 264 . . . spring, 280 . . . stirrer, C . . . capsule (item).

The invention claimed is:

1. An item dispensing device for dispensing a plurality of items, one item at a time, comprising:
   a storage portion for storing the plurality of items;
   an item ejection port opened in a lower side-wall of the storage portion;
   a rotating shaft provided in a lower part of the storage portion;
   a disc-shaped rotor provided in the lower part of the storage portion to rotate along with the rotating shaft, wherein a plurality of substantially half-oval shaped item holders opened radially outward and adapted to hold one item in each holder are disposed along the circumferential direction of the disc-shaped rotor; and
   an ejection mechanism adapted to push out the item held in one of the plurality of item holders radially outward and eject the item substantially horizontally out of the storage portion through the item ejection port when an opening of the said item holder is aligned with the item ejection port with rotation of the rotor,
   wherein the ejection mechanism comprises:
   a linear guide provided in the proximity of the item holder of the rotor and arranged outward from the rotating shaft side in the rotor;
   a slider reciprocably attached to the linear guide;
   a spring member for pushing out the slider radially outward;
   a ring-shaped rail which is partially opened in accordance with the item ejection port;
   a guide rail joined to an opening end on the downstream side of the ring-shaped rail; and
   a protrusion provided on the slider and adapted to engage with an inner peripheral surface of the ring-shaped rail and an inner side surface of the guide rail, and
   wherein, when the protrusion reaches the opening of the ring-shaped rail with rotation of the rotor, the spring member is released and the repulsive force of the spring member causes the slider to be repelled radially outward from an ordinary position closest to a rotation center, and when the protrusion moves along the inner side surface of the guide rail, coming back to the ring-shaped rail, the slider returns to the ordinary position.

2. An item dispensing device for dispensing a plurality of items, one item at a time, comprising:
   a storage portion for storing the plurality of items;
   an item ejection port opened in a lower side-wall of the storage portion;
   a rotating shaft provided in a lower part of the storage portion;
   a disc-shaped rotor provided in the lower part of the storage portion to rotate along with the rotating shaft, wherein a plurality of substantially half-oval shaped item holders opened radially outward and adapted to hold one item in each holder are disposed along the circumferential direction of the disc-shaped rotor; and
   an ejection mechanism adapted to push out the item held in one of the plurality of item holders radially outward and eject the item substantially horizontally out of the storage portion through the item ejection port when an opening of the item holder is aligned with the item ejection port with rotation of the rotor,
   wherein the energizing mechanism comprises:
   a plurality of lever members provided in the proximity of the item holders in the rotor, respectively, and pivotally supported to pivotably move between a stored position on the inner edge side of the item holder and a push-out position on the opening side of the item holder; and
   a spring member for pushing out the lever member toward the push-out position side,
   wherein a long-shaft portion to abut the item and a short-shaft portion of the lever member forms a substantially L-shape, the lever member being pivotally supported about the bending portion thereof, wherein the short-shaft portion is pressed against an inner wall surface of the storage portion against the energizing force of the spring member, thereby placing the long-shaft portion in the stored position, and wherein, when the opening of one of the plurality of item holders is aligned with the item ejection port with rotation of the rotor, the short-shaft portion is released from the pressing force against the inner wall surface, thereby causing the long-shaft portion to pivot toward the push-out position side.

* * * * *